United States Patent [19]
Nagatomo

[11] Patent Number: 5,054,289
[45] Date of Patent: Oct. 8, 1991

[54] HYDRAULIC TRANSMISSION

[75] Inventor: Hisao Nagatomo, Fukuoka, Japan

[73] Assignee: Nagatomo Fluid Machinery Laboratory Limited, Fukuoka, Japan

[21] Appl. No.: 288,478

[22] Filed: Dec. 22, 1988

[30] Foreign Application Priority Data

Dec. 15, 1987 [JP] Japan ........ 62-327443
Jun. 3, 1988 [JP] Japan ........ 63-135651

[51] Int. Cl.[5] ........ F16H 39/14; F16D 31/08
[52] U.S. Cl. ........ 60/468; 60/488; 60/489; 92/157
[58] Field of Search ........ 60/489, 488, 464, 468, 60/494; 92/157

[56] References Cited

U.S. PATENT DOCUMENTS

| | | | |
|---|---|---|---|
| 4,745,748 | 5/1988 | Hayashi et al. | 60/489 |
| 4,748,898 | 6/1988 | Hayashi et al. | 60/487 X |
| 4,781,022 | 11/1988 | Hayashi et al. | 60/489 |
| 4,827,721 | 5/1989 | Hayashi et al. | 60/489 |
| 4,854,125 | 8/1989 | Inoue | 60/489 |
| 4,856,279 | 8/1989 | Kawahara et al. | 60/489 |
| 4,860,540 | 8/1989 | Hayashi et al. | 60/487 |

FOREIGN PATENT DOCUMENTS

| | | | |
|---|---|---|---|
| 745543 | 2/1956 | United Kingdom | 60/490 |

*Primary Examiner*—Edward K. Look
*Assistant Examiner*—George Kapsalas
*Attorney, Agent, or Firm*—Oliff & Berridge

[57] ABSTRACT

When a first rotating shaft is rotationally driven, it rotates a first cylinder barrel splined thereto, and a second cylinder barrel and a valve block united with the first cylinder barrel. In accordance with these rotations, first pistons in first cylinders slide circumferentially on the inclined face of a first swash plate so that they are reciprocated axially in the first cylinder barrel, and second pistons in second cylinders slide circumferentially on the inclined face of a second swash plate so that they are reciprocated axially in the second cylinder barrel. Simultaneously with these reciprocations, a first change-over valve is switched in accordance with the rotations of the first rotating shaft, and a second change-over valve is switched in accordance with the relative rotations of the first rotating shaft and the second rotating shaft. Thus, a high-pressure liquid discharged from the second cylinders during forward strokes of the second pistons is supplied via a second common liquid passage into the first cylinders during backward strokes of the first pistons, and a low-pressure liquid discharged from the first cylinders during forward strokes of the first pistons is sucked via a first common liquid passage into the second cylinders during backward strokes of the second pistons.

13 Claims, 11 Drawing Sheets 12 40 33 32 26 5 41 14 13 48 47 9 10 15 36 3 11 39 22 105 42 2 45 44 1 23 20 29 16 23 28 102 37 101 38 8 4 7 6 43 22 18 17 27 19

28a
29
27
26
5
23
30
27a
5a
22
28
25

19b
19a
18
20
5a
24
21
5
22
23
20a 123
131
123b
130
30a
5
28a
123a
28
133
125
30a
124
127
δ

21a
3
132
21a 1
2
3
4
5
6
7
7a
8
9
10
11
12
13
14
14a
14b
16
17
17a
17b
18
19
20
22
23
27
28
29
32
33
36
37
38
39
40
41
49
60a
60e
62
63
64
65
65a
66
67
68
69
72
77
78

1
42
44
37
32
36
43
10
9
101
3
11
105
8
6
40
12
47
7
48
5
18
102
19
26
13
22
22
27
14
20
29
28
4
41
23
23
16
15
33
17
38
39
2

HYDRAULIC TRANSMISSION

BACKGROUND OF THE INVENTION

1. Field of the Invention

The present invention relates to a hydraulic transmission and, more particularly, to a hydraulic transmission suitable for transmitting the rotational power of an input shaft to an output shaft at a varying speed.

2. Description of the Prior Art

In the prior art, a hydraulic motor is rotationally driven to extract a rotational power therefrom by inputting the rotational power to a hydraulic pump to feed the pressurized oil discharged from the hydraulic pump to the hydraulic motor. The rotating speed of the hydraulic motor is varied by using either of a hydraulic pump or motor of variable capacity type.

With this structure, however, power loss is increased because the entire power inputted to the hydraulic pump is transmitted through the pressurized oil to the hydraulic motor. The hydraulic pump and motor are large-sized and expensive because they have to be designed to have capacities sufficient for the maximum power to be transmitted.

In order to solve these difficulties, there has been proposed a hydraulic transmission which has its power transmission efficiency improved by dividing the power trains into mechanical and hydraulic transmissions to increase the ratio of the power mechanically transmitted under a high load.

The hydraulic transmission of this type is exemplified in FIGS. 15 to 17.

In FIG. 15, reference numeral 01 designates a shaft which is retained irrotationally in a stationary member 03 through a coupling 02 splined to the right-hand end thereof, and which has its lefthand end splined to a cylinder barrel 04. This cylinder barrel 04 is formed with a plurality of (e.g., seven, as shown) cylinders 05 which extend from the righthand end face thereof in the axial direction and at a predetermined spacing in the circumferential direction of a cylindrical plane formed on the axis thereof. Pistons 06 are fitted liquid-tight and slidably in the cylinders 05, respectively. Each of those pistons 06 has its outer end ball 06*a* received in a slipper pad 07 while being permitted to accomplish relative angular movements. The slipper pad 07 is held by a retainer 08 in sliding contact with the surface of a liner 010 which is fixed on a swash plate 09. This swash plate 09 is rotatably supported on a trunnion 011 perpendicular to the shaft 01. A slider 012 extends radially from the periphery of the swash plate 09 and is fitted slidably in a groove 013*a* of a ring-shaped guide 013.

Thus, the swash plate 09 can be rotated around the trunnion 011 by moving the guide 013 toward the shaft 01 to change the angle of inclination of the liner 010, i.e., the inclined sliding face to an arbitrary value.

The cylinder barrel 04 is opened, as shown in FIG. 16, by cocoon-shaped cylinder ports 014 which communicate with the cylinders 05, respectively. These cylinder ports 014 are aligned, as shown in FIG. 17, with a crescent high-pressure port 016 or low-pressure port 017, which is opened into the righthand end face of a valve block 015.

Reference numeral 018 designates an output shaft which is arranged coaxially with the shaft 01. To the righthand end of the output shaft 018, there is splined a cylinder barrel 019. This cylinder barrel 019 is formed with a plurality of (e.g., seven, as shown) cylinders 021 which extend axially from the lefthand end face thereof and at a predetermined spacing in the circumferential direction of a cylindrical face formed around the axis of the cylinder barrel 019. Pistons 022 are fitted liquid-tight and slidably in the cylinders 021, respectively. Each of these pistons 022 has its outer end ball 022*a* received in a slipper pad 023 while being permitted to accomplish relative angular movements. The slipper pad 023 is so retained by a retainer 024 such that it is held in sliding contact with the surface of a liner 026 fixed on a swash plate 025 united with a lefthand internal casing 034. The cylinder barrel 019 has its righthand end face opened by a cocoon-shaped cylinder port 027 communicating with each cylinder 021 like that shown in FIG. 16. The cylinder ports 027 are aligned with a crescent high-pressure port 028 or low-pressure port 029 opened into the lefthand end face of the valve block 015 like that shown in FIG. 17. Moreover, this high-pressure port 028 is made to communicate with the high-pressure port 016 by way of a high-pressure liquid passage 30, whereas the low-pressure port 029 is made to communicate with the low-pressure port 017 through a low-pressure liquid passage 031. The cylinder barrel 04 is supported by a bearing 032 in the rightward projecting end of a rod 051, which extends through the center of and is fixed by the valve block 015. The cylinder barrel 019 is supported by a bearing 020 in the leftward projecting end of the rod 051.

The valve block 015 is interposed at its peripheral edge between the lefthand end face of a righthand internal casing 033 and the righthand end face of a lefthand internal casing 034, and these members are fastened together by means of bolts 035. The shaft 01 extends through a cylindrical portion 033*a* extending rightward from the righthand end of the righthand internal casing 033. The cylindrical portion 033*a* is supported on the shaft 01 by a bearing 036 arranged in the cylindrical portion 033*a*. The clearance between the cylindrical portion 033*a* and the shaft 01 is sealed up by a sealing device 037 which is arranged at the righthand side of the bearing 036. Moreover, a pinion 038 is keyed at 052 to the righthand periphery of the cylindrical portion 033*a* and is retained on the cylindrical portion 033*a* by a nut 039 screwed on the righthand end of the cylindrical portion 033*a*. On the other hand, the output shaft 018 extends through a cylindrical portion 034*a* which extends leftward from the lefthand end of the lefthand internal casing 034. The cylindrical portion 034*a* is supported on the output shaft 018 through a bearing 040 which is arranged in the cylindrical portion 034*a*. The clearance between the cylindrical portion 034*a* and the output shaft 018 is sealed up by a sealing device 041 which is arranged at the lefthand side of the bearing 040.

The trunnion shaft 011 has its two ends supported in the righthand internal casing 033. Reference numeral 042 designates an external casing which is fixed to the stationary member 03 by conventional means (not shown). The external casing 042 is constructed by fastening a cylindrical member 043 and an end plate 044 covering the righthand opening of the cylindrical member 043 by means of bolts 045. The cylindrical member 043 has its lefthand end portion supported on the cylindrical portion 034*a* of the lefthand internal casing 034 by means of a bearing 046. The clearance between the cylindrical member 043 and the cylindrical portion 034*a* is sealed up by a sealing device 047 which is arranged at the lefthand side of the cylindrical portion 034*a*. On the other hand, the end plate 044 is supported on the cylindrical portion 033*a* of the righthand internal casing 033 by means of a bearing 048, and the clearance between the end plate 044 and the cylindrical portion 033*a* is sealed up by means of a sealing device 049 which is arranged at the righthand side of the bearing 048.

Thus, when the pinion 038 is rotationally driven, it rotates the righthand internal casing 033, the lefthand internal casing 034, the valve block 015 and the swash plates 09 and 025 together. In accordance with these rotations, the valve block 015 is rotated relative to the cylinder barrels 04 and 019, while having its righthand end face held in sliding contact with the lefthand end face of the cylinder barrel 04 and its lefthand end face held in sliding contact with the righthand end face of the cylinder barrel 019. The slipper pads 07 slide on the inclined sliding face of the liner 010 which is fixed on the swash plate 09, and the slipper pads 023 slide on the inclined sliding face of the liner 026 fixed on the swash plate 025.

Thus, while the pistons 06 are reciprocated axially in the cylinders 05 so that the cylinder ports 014 are aligned with the crescent high-pressure port 016, the pistons 06 accomplish their forward strokes to discharge the liquid from the cylinders. While the cylinder ports 014 are aligned with the low-pressure port 017, the pistons 06 accomplish their backward strokes to suck the liquid into the cylinders 05.

The high-pressure liquid discharged from the cylinders 05 flows into the cylinders 021 via the cylinder ports 014, the high-pressure port 016, the highpressure liquid passage 030, the high-pressure port 028 and the cylinder ports 027 to push the pistons 022. Then, the pistons 022 start their backward strokes so that the cylinder barrel 019 and the output shaft 018 splined thereto are rotated because the outer end balls 022*a* of the pistons 022 are held in sliding contact with the inclined sliding face of the liner 026 fixed on the swash plate 025 through the slipper pads 023.

When the pistons 022 end their backward strokes to pass over their bottom dead centers, they start their forward strokes to discharge the low-pressure liquid from the cylinders 021. The low-pressure liquid thus discharged is sucked into the cylinders 05 via the cylinder ports 027, the low-pressure port 029, the lowpressure liquid passage 031, the low-pressure port 017 and the cylinder ports 014.

Now, if the number of revolutions of the pinion 038 is denoted at $n_1$, the number of revolutions of the output shaft 018 at $n_2$, the stroke volume of the cylinders 05 at $V_1$ and the stroke volume of the cylinders 021 at $v_2$, the following equation holds:

$$n_2 = n_1 \cdot (1 - v_1/v_2).$$

The stroke capacity $v_2$ is constant because the angle of inclination of the swash plate 025 cannot be changed, but the stroke capacity $v_1$ can be arbitrarily varied if the swash plate 09 is inclined around the trunnion 011 to change its angle of inclination by moving the guide 013 along the shaft 01. As a result, the number of revolutions $n_2$ of the output shaft 018 can be arbitrarily changed.

If, on the other hand, the angle of inclination of the swash plate 09 is set at zero, the pistons 06 are not reciprocated so that the stroke capacity $v_1$ is zero. Then, the pistons 022 are not reciprocated if the liquid does not leak. As a result, the cylinder barrel 019 is rotated at the same speed as that of pinion 038 as if it were locked by the swash plate 025 and the valve block 015. Thus, the power inputted from the pinion 038 is mechanically transmitted to the output shaft 018 through the righthand internal casing 033, the valve block 015, the lefthand internal casing 034 and the cylinder barrel 019.

In this hydraulic transmission, the valve block 015 is rotated, while sliding, relative to the cylinder barrels 04 and 019. Thus, this transmission is susceptible not only to friction loss at those sliding faces, but also to wear of the sliding faces and liquid leakage from the sliding faces.

Since, moreover, the swash plate 09 is rotatably supported in the righthand internal casing 033 through the trunnion 011, it is rotated by rotations of the pinion 038 so that dynamic imbalance is seriously increased.

Since, moreover, high frequency vibrations of swash plate 09 accompany the reciprocations of the pistons 06 it is difficult to maintain the reliability of the slider 012 and the guide 013.

Since, moreover, the shaft 01 has to be irrotationally retained, the power has to be inputted from the drive shaft eccentric from the axis of the shaft 01 to the pinion 038 through a gear train or chain.

Since, moreover, the casing has to be double walled, the structure is so complicated and large-sized that the hydraulic transmission is not practical.

SUMMARY OF THE INVENTION

One object of the present invention is to provide a hydraulic transmission capable of outputting an inputted power at an arbitrary speed.

Another object of the present invention is to provide a hydraulic transmission wherein the transmission efficiency is improved by making the power to be mechanically transmitted higher than the power to be hydraulically transmitted.

Still another object of the present invention is to provide a hydraulic transmission which is low in dynamic imbalance, vibration and noise.

A further object of the present invention is to provide a hydraulic transmission capable of inputting and outputting a rotational power along one straight line.

A further object of the present invention is to provide a hydraulic transmission which has a simple structure, a small size and a light weight.

A further object of the present invention is to provide a hydraulic transmission with lightened thrust acting upon the bearing of the second rotating shaft.

A further object of the present invention is to provide a hydraulic transmission capable of supplying the liquid while running so that it can be run continuously and efficiently while preventing shortage of the liquid caused by leakage of the liquid.

A further object of the present invention is to provide a hydraulic transmission capable of automatically preventing any breakage due to an overload.

According to the present invention, there is provided a hydraulic transmission comprising: a first rotating shaft; a second rotating shaft arranged coaxially with said first rotating shaft; a first cylinder barrel splined to said first rotating shaft; a second cylinder barrel arranged coaxially with and rotatably relative to said second rotating shaft; a valve block interposed between and united with an inner end face of said first cylinder barrel and an inner end face of said second cylinder barrel; a plurality of first cylinders formed in said first cylinder barrel to extend from an outer end face thereof substantially in the direction of the axis thereof and arranged at a predetermined spacing from one another in a circumferential direction around the axis; a first swash plate having an inclined face and on an axis of rotation perpendicular to said first rotating shaft; a plurality of first pistons fitted liquid-tight and slidably in said first cylinders, respectively, and adapted to be reciprocated by having outer ends thereof held in abutting contact with said first swash plate as said first cylinder barrel rotates; a plurality of second cylinders formed in said second cylinder barrel to extend from an outer end face thereof substantially in the direction of the axis thereof and arranged at a predetermined spacing from one another in a circumferential direction around the axis; a second swash plate united with said second rotating shaft; a plurality of second pistons fitted liquid-tight and slidably in said second cylinders, respectively, and adapted to be reciprocated by having outer ends thereof held in abutting contact with said second swash plate as said second cylinder barrel rotates; a first changeover valve built into said valve block and switched according to rotations of said first rotating shaft for causing said first cylinders to communicate with a first common liquid passage during forward strokes of said first pistons and to communicate with a second common liquid passage; during backward strokes of said first pistons and a second change-over valve built into said valve block and switched according to relative rotations of said first rotating shaft and said second rotating shaft for causing said second cylinders to communicate with said first common liquid passage during backward strokes of said second pistons and to communicate with said second common liquid passage during forward strokes of said second pistons.

Thus, when the first rotating shaft is rotationally driven, it rotates the first cylinder splined thereto and the second cylinder barrel and the barrel block both united with the first cylinder. In accordance with these rotations, outer ends of the first pistons slide circumferentially on the inclined face of the first swash plate so that the first pistons are axially reciprocated in the first cylinder barrel. At same time, the outer ends of the second pistons slide circumferentially on the inclined face of the second swash plate so that the second pistons are axially reciprocated in the second cylinders. Simultaneously with this, by the action of the change-over valve, the first cylinders are caused to communicate with the first common liquid passage, during forward strokes of the first pistons and the first cylinders are caused to communicate with the second common liquid passage during backward strokes of the first pistons. By the action of the second change-over valve, moreover, the second cylinders are caused to communicate with the first common liquid passage during backward strokes of the second pistons, and the second cylinders are caused to communicate with the second common liquid passage during forward strokes of the second pistons.

Thus, the high-pressure liquid discharged from the second cylinders during the forward strokes of the second pistons is supplied by way of the second common liquid passage to the first cylinders during the backward strokes of the first pistons, and the low-pressure liquid discharged from the first cylinders during the forward strokes of the first pistons is sucked by way of the first common liquid passage into the second cylinders during the backward strokes of the second pistons.

By inclining the first swash plate around the axis of rotation to vary the angle of inclination of the inclined face to an arbitrary value, the power inputted to the first or second rotating shaft can be extracted at an arbitrary speed from the second or first rotating shaft. If the angle of inclination of the inclined face of the first swash plate is zero, the second rotating shaft is rotated together with the second cylinder barrel at the same speed as that of the first rotating shaft so that the entire power can be efficiently transmitted in a mechanical manner.

Since, moreover, the first and second change-over valves are built into the valve block, the first cylinder barrel and the second cylinder barrel can be united and rotated together. Since these first and second cylinder barrels are not brought into sliding contact with the valve prevent, it is possible to block their mutual friction loss and the liquid leakage from the clearance between the cylinder barrels and valve block.

Since, moreover, the first swash plate can be supported in the stationary casing or the like through the trunnion, the statically and dynamically imbalanced first swash plate is not rotated during running of the transmission. As a result, the first swash plate can be easily rotated around the trunnion even during running of the transmission, and the first swash plate and its bearing mechanism can be simplified to improve their reliability.

Since, moreover, the first rotating shaft and the second rotating shaft can be aligned, the power inputting or outputting mechanism can be small-sized and simplified so that it can be conveniently used.

Since, moreover, the casing can be single walled, the transmission can be made small and light.

Moreover, if the balance pads are fitted liquid-tight and slidably in the recesses formed in the outer end face of the second swash plate, extend axially and are held in sliding contact with the inner end face of the casing facing but spaced from the outer end face of the second swash plate, and if the high-pressure liquid in the second cylinders is supplied through the pockets, which are defined by the sliding faces of the slipper pads, the inclined face of the second swash plate, and the check-valves to the pressure chambers which are defined by the top faces of the balance pads and the recesses, so that they are forced into contact with the inner end face of the casing, the reaction thrust to be loaded upon the bearing of the second rotating shaft can be lightened so that the bearing can be small-sized and lightened to improve its durability.

If there are provided the supply liquid passages for supplying the supply liquid to the first and second common liquid passages through the first rotating shaft and the first cylinder barrel by way of the check valves, respectively, the first and second common liquid passages can be supplied with the supply liquid through the supply liquid passages even during running of the transmission so that the transmission can be run continuously and efficiently while preventing liquid shortage due to liquid leakage.

If, moreover, the safety valve spool is arranged liquid-tight and slidably coaxially with the first rotating shaft so that it may be axially moved to provide communication between the first common liquid passage and the second common liquid passage when the pushing force of the liquid in the first or second common liquid passage acting upon one end of the safety valve spool exceeds the pushing force of the supply liquid acting upon the other end face, the pressure of the liquid in the first or second common liquid passage is prevented from exceeding a predetermined level by the increase in the load acting upon the transmission, and the pressure of the supply liquid can be varied from the outside during running of the transmission so that the load allowable for the transmission can be easily varied even during running.

If, moreover, the safety valve spool is formed with the supply liquid passages having communication with the first and second common liquid passages and if the check valves are incorporated into the supply liquid passages, the supply liquid can be supplied while preventing breakage of the transmission due to overload irrespective of the rotational direction of the transmission and which of the rotating shafts is to be supplied with power.

BRIEF DESCRIPTION OF THE DRAWINGS

A first embodiment of the hydraulic transmission according to the present invention is shown in FIGS. 1 to 3, of which.

A second embodiment of the hydraulic transmission according to the present invention is shown in FIGS. 4 to 7, of which.

A third embodiment of the hydraulic transmission according to the present invention is shown in FIGS. 8 to 10, of which.

A fourth embodiment of the hydraulic transmission according to the present invention is shown in FIGS. 11 to 14, of which.

One example of the hydraulic transmission of the prior art is shown in FIGS. 15 to 17, of which.

DETAILED DESCRIPTION OF THE PREFERRED EMBODIMENTS

Figure 1:
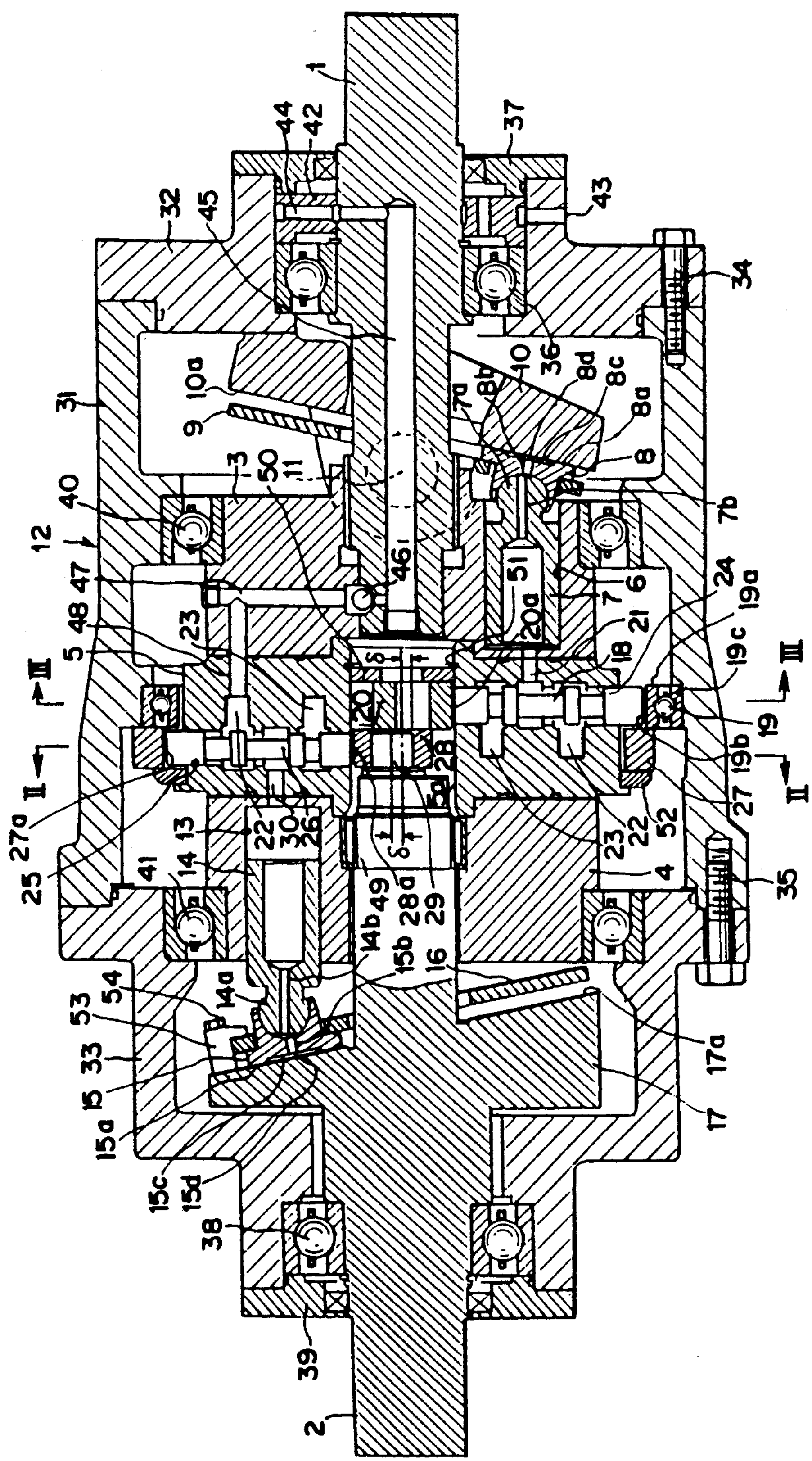
FIG. 1 is a longitudinal section.
Figure 2:
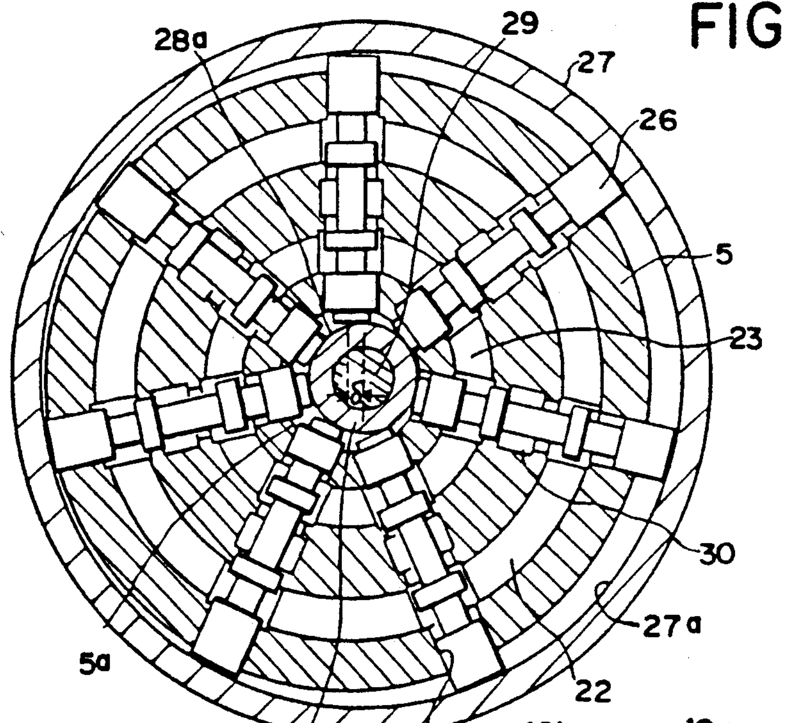
FIG. 2 is a section taken along line II—II of FIG. 1.
Figure 3:
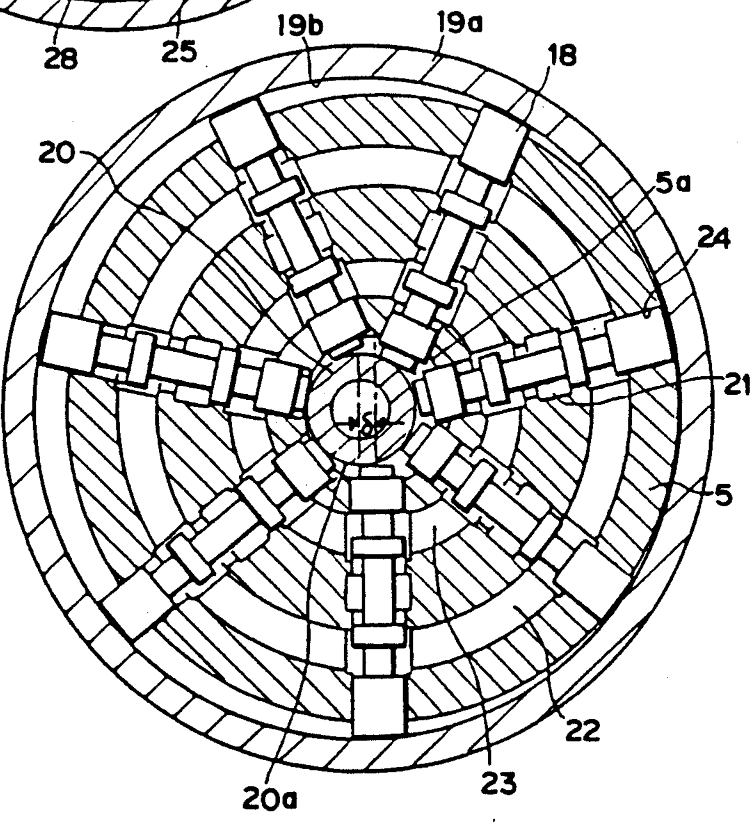
FIG. 3 is a section taken along line III—III of FIG. 1.
Figure 4:
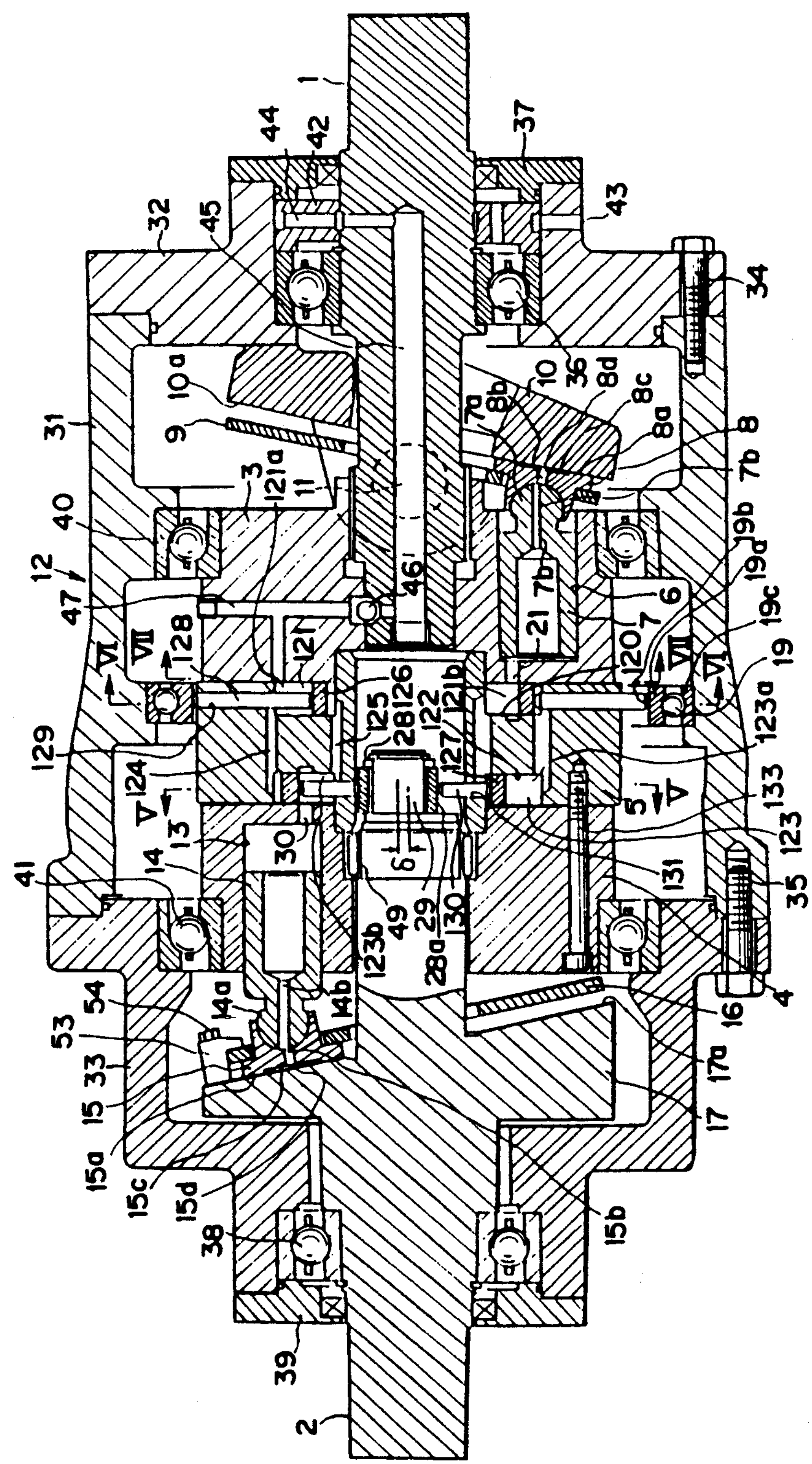
FIG. 4 is a longitudinal section.
Figure 5:
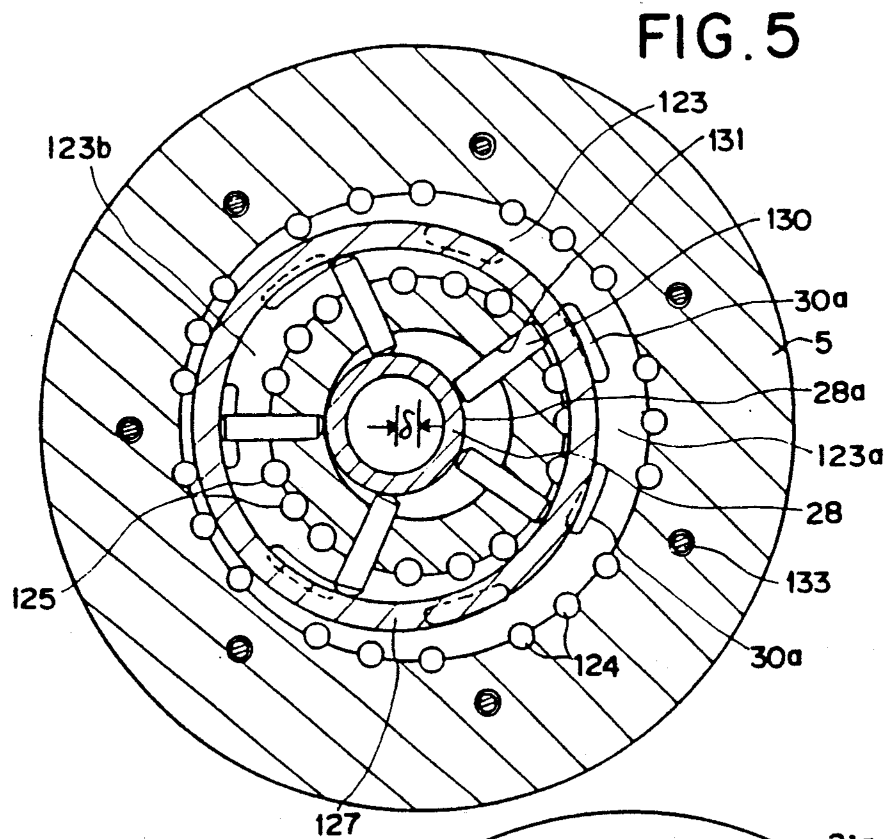
FIG. 5 is a section taken along line V-V of FIG. 4.
Figure 7:
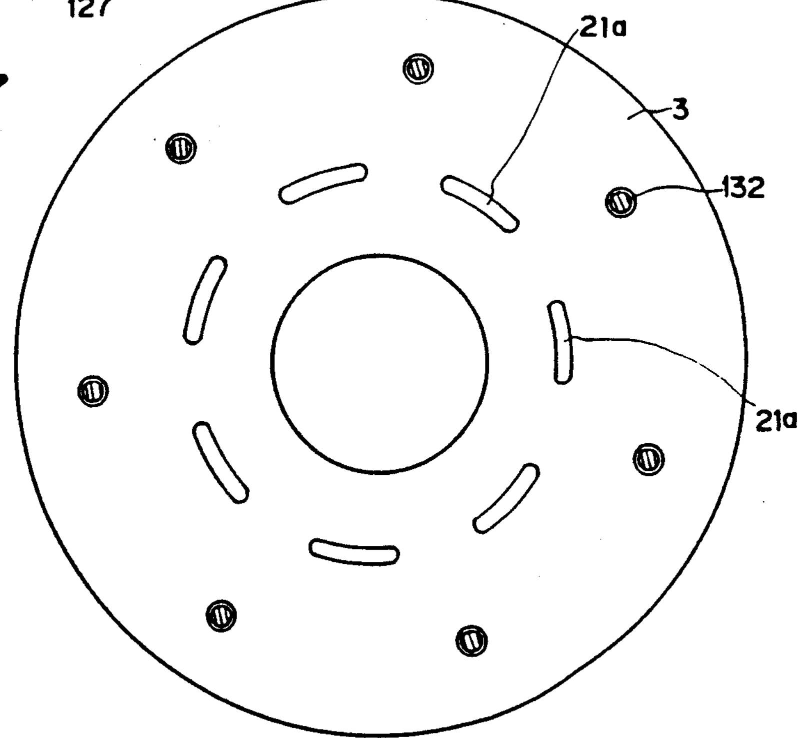
FIG. 7 is a section taken along line VII-VII of FIG. 4.
Figure 6:
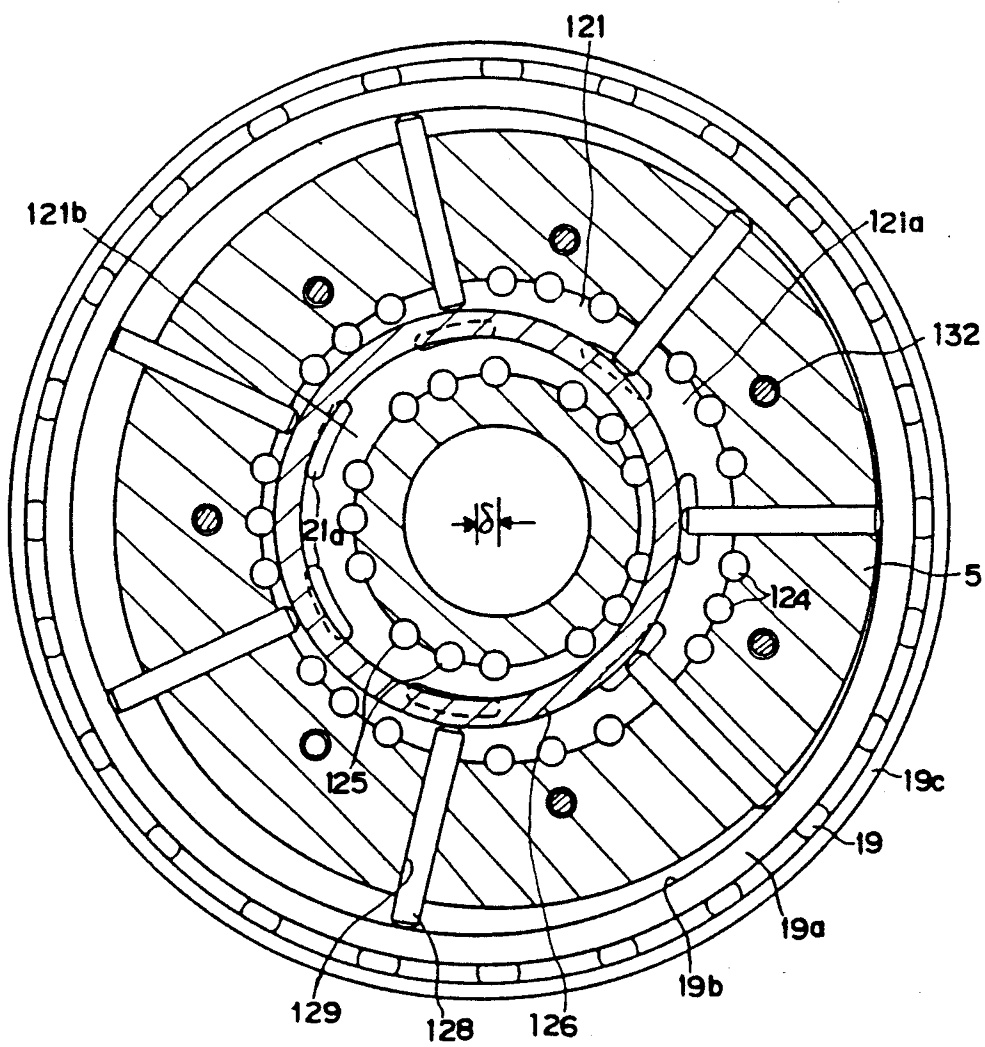
FIG. 6 is a section taken along line VI-VI of FIG. 4.

One embodiment of the present invention is shown in FIGS. 1 to 3.

In FIG. 1, reference numeral 1 designates a first rotating shaft, and numeral 2 designates a second rotating shaft which is arranged coaxially with the first rotating shaft 1. Numeral 3 designates a first cylinder barrel which is splined to the first rotating shaft 1. Numeral 4 designates a second cylinder barrel which is disposed coaxially with and rotatably relative to the second rotating shaft 2. Numeral 5 designates a valve block which is sandwiched between the inner end faces of the first cylinder barrel 3 and the second cylinder barrel 4 and fixed integrally therewith by means of pins. In the first cylinder barrel 3, there are arranged a plurality of (e.g., seven, as shown) first cylinders 6 which are spaced at a predetermined distance from one another circumferentially around a circle of which the center is the axis of the first cylinder barrel 3. These cylinders 6 are so formed in the outer end of the first cylinder barrel 3 as to extend substantially in the axial direction thereof. In each of these cylinders 6, there is liquid-tight and slidably fitted a first piston 7 which has its outer ball end 7a received in the socket of a slipper pad 8 while being permitted to accomplish relative angular movements. This slipper pad 8 is retained by a retainer 9 and has its sliding face 8a held in sliding contact with the inclined face 10a of a first swash plate 10. This first swash plate 10 is so supported in a casing 12 through a trunnion 11 which is perpendicular to the axis of the first rotating shaft 1 as to rotate around the trunnion 11.

In the second cylinder barrel 3, there are arranged a plurality of (e.g., seven, as shown) second cylinders 13 which are spaced at a predetermined distance from one another circumferentially around a circle of which the center is the axis of the second cylinder barrel 4. These cylinders 13 are so formed in the outer end of the second cylinder barrel 4 as to extend substantially in the axial direction thereof. In each of these cylinders 13, there is liquid-tight and slidably fitted a second piston 14 which has its outer ball end 14a received in the socket of a slipper pad 15 while being permitted to accomplish relative angular movements. This slipper pad 15 is retained by a retainer 16 and has its sliding face 15a held in sliding contact with the inclined face 17a of a second swash plate 17 united with the second rotating shaft 2.

The valve block 5 is formed, in its plane normal to the axis thereof, with a plurality of (e.g., the same seven as that of the first cylinders 6) first spool bores 24 which extend radially from the axis of the valve block 5. A first spool 18 is fitted liquid-tight and slidably in each of those spool bores 24. The first spool 18 has its outer end held in abutting contact with the cylindrical cam face 19b of a cam ring 19a which forms the inner race of a ball bearing 19 fixed on the inner surface of the casing 12. The inner end of the first spool 18 is held in abutting contact with the cylindrical face 20a of a ring 20 which is disposed in a bore 5a formed at the center of the valve block 5. The cam face 19b of the cam ring 19a and the face 20a of the ring 20 are offset by a distance $\delta$ from the axis of the valve block 5 in the direction of the trunnion 11, as apparently seen from FIG. 3. For convenience of understanding, the offset $\delta$ is shown in FIG. 1 to appear in a direction perpendicular to the trunnion 11.

In the valve block 5, on the other hand, there are formed a plurality of cylinder ports 21 which are spaced at a predetermined distance from one another circumferentially around a circle of which the center is the axis of the valve block 5 such that they communicate with the respective bottoms of the first cylinders 6. A first common liquid passage 22 of annular shape is formed radially outside of each of the cylinder ports 21, and a second common liquid passage 23 of annular shape is formed radially inside of each of the cylinder ports 21. These cylinder ports 21 and first and second common liquid passages 22 and 23 communicate with the spool bores 24, respectively, so that the cylinder ports 21 are selectively caused to communicate with the first or second common liquid passage 22 or 23 when the spools 18 are radially reciprocated in their respective spool bores 24.

On the other hand, the valve block 5 is formed, as shown in FIG. 2, with second spool bores 25 of the same number as that of the second cylinders 13. The second spool bores 25 are slightly spaced apart in the axial direction from the aforementioned first spool bores 24. The second spool bores 25 are arranged in a plane normal to the axis of the valve block 5 and extend radially from the same axis with a predetermined angular displacement such that they are interposed between the first spool bores 24. In each of those second spool bores 25, there is fitted liquid-tight and slidably a second spool 26 which has its outer end held in abutting contact with the cylindrical face 27*a* of a ring 27 and its inner end held in abutting contact with the cylindrical cam face 28*a* of a cam ring 28. This cam ring 28 is pivoted on a pin 29 extending from the inner end of the second rotating shaft 2. The pin 29 is offset by the distance $\delta$ from the axis of the second rotating shaft 2 in the direction of the neutral line of the inclined face 17*a* of the second swash plate 17, i.e., in the direction lying in the inclined face 17*a*and perpendicular to the second rotating shaft 2. The ring 27 in abutting contact with the outer end of the spool 26 is also offset by the distance $\delta$ in the same direction as the offset direction of the cam ring 28. Moreover, the spool bore 25 communicates with both a cylinder port 30, which in turn communicates with the bottom of the second cylinder 13, and the first and second common liquid passages 22 and 23 so that the cylinder port 30 is selectively caused to communicate with the first or second common liquid passage 22 or 23 by reciprocating the second spool 26 in the radial direction.

The casing 12 is constructed of a cylindrical portion 31, an end plate 32 covering one opening of the cylindrical portion 31 and an end plate 33 covering the other opening of the cylindrical portion 31. These cylindrical portion 31 and end plates 32 and 33 are fastened together by means of bolts 34 and 35. The first rotating shaft 1 extends through the end plate 32 and has its extension arranged with a bearing 36 and a sealing device 37 at the outside of the bearing 36. The second rotating shaft 2 extends through the end plate 33 and has its extension arranged with a bearing 38 and a sealing device 39 at the outside of the bearing 38. The first cylinder barrel 3, the second cylinder barrel 4 and the valve block 5 are accommodated together in the casing 12 and are rotatably supported in the casing 12 through both a bearing 40, which is fitted between the periphery of the first cylinder barrel 3 and the inner surface of the cylindrical portion 31, and a bearing 41 which is fitted between the periphery of the second cylinder barrel 4 and the inner surface of the end plate 33.

A seal ring 42 is interposed between the bearing 36 and the sealing device 37 so that the liquid supplied from a supply port 43 opened in the end plate 32 is supplied to the first common liquid passage 22 by way of a passage 44 formed in the seal ring 42, a passage 45 formed in the first rotating shaft 1, a check valve 46, a passage 47 formed in the first cylinder barrel 3, and a passage 48 formed in the valve block 5. Moreover, the passage 45 communicates with the second common fluid passage 23 through a check valve, although not shown.

Each first piston 7 is formed in its outer ball end 7*a* with a hole 7*b* extending therethrough. The high-pressure liquid in the corresponding first cylinder 6 is supplied through that hole 7*b* to the clearance between the embracing face of the slipper pad 8 and the outer surface of the outer ball end 7*a* to lubricate them. After these lubrications, the liquid flows through a hole 8*b* extending through the slipper pad 8 into a pocket 8*d*, which is defined by both a recess 8*c* formed in the sliding face 8*a* and the inclined face 10*a* of the first swash plate 10, to lubricate the sliding face 8*a* and the inclined face 10*a* and to reduce the thrust to be exerted therebetween. Likewise, each second piston 14 is formed in its outer ball end 14*a* with a hole 14*b* extending therethrough. The high-pressure liquid in the corresponding second cylinder 13 is supplied through that hole 14*b* into the clearance between the embracing face of the slipper pad 15 and the outer surface of the outer ball end 14*a* to lubricate them. After these lubrications, the liquid flows through a hole 15*b* extending through the slipper pad 15 into a pocket 15*d*, which is defined by both a recess 15*c* formed in the sliding face 15*a* and the inclined face 17*a* of the second swash plate 17, to lubricate the sliding face 15*a* and the inclined face 17*a* and to reduce the thrust to be exerted therebetween.

Reference numeral 49 designates a bearing which is fitted between the periphery of the inner end of the second rotating shaft 2 and the inner surface of the second cylinder barrel 4. Numeral 50 designates a collar for regulating the axial position of the ring 20. The collar 50 is retained in the hole 5*a* of the valve block 5 by a snap ring 51. The ring 20 rotates around its axis while being held in sliding contact with the collar 50 and the cam ring 28. Numeral 52 designates a collar for regulating the axial position of the ring 27. The collar 52 is retained on the periphery of the valve block 5. The ring 27 rotates around its axis while being held in sliding contact with the collar 52 and the bearing 19. Numeral 53 designates a bracket for supporting the retainer 16. The bracket 53 is fastened to the second swash plate 17 by means of bolts 54. The retainer 9 is also supported by the first swash plate 10 by a similar mechanism, although not shown.

When the first rotating shaft 1 is rotationally driven, it rotates the first cylinder barrel 3 splined thereto and the second cylinder barrel 4 and valve block 5 united therewith. In accordance with this, the outer ball end 7*a* of each first piston 7 slides in the circumferential direction on the inclined face 10*a* of the first swash plate 10 through the slipper pad 8 so that the first piston 7 is reciprocated in the axial directions in the corresponding first cylinder 6. Simultaneously with this, the spool 18 is urged in the radial direction by centrifugal force but has its outer end regulated by the abutting contact with the cylindrical cam face 19*b* of the cam ring 19*a* so that the spool 18 is reciprocated in the radial directions in the spool bore 24 in synchronism with the first piston 7. During the return stroke of the first piston 7, moreover, the cylinder port 21 communicating with the cylinder 6 is caused to communicate with the first common liquid passage 22 by the spool 18 to suck the high-pressure liquid therein into the cylinder 6. The communication between the cylinder 6 and the first common liquid passage 22 is blocked by the spool 18 when the first piston 7 reaches its bottom dead center, and the cylinder port 21 is caused to communicate with the second common liquid passage 23 by the spool 18, when the first piston 7 starts its forward stroke, so that the liquid is discharged from the cylinder 6 through the cylinder port 21 into the second common liquid passage 23. After the end of the forward stroke, top dead center is reached so that the communication is blocked from the second common liquid passage 23 to start the backward stroke again.

The low-pressure liquid having flowed into the second common liquid passage 23 is sucked via the cylinder port 30 into the second cylinder 13 as the second spool 26 is reciprocated in the spool bore 25 in synchronism with the second piston 14. In accordance with this, the slipper pad 15 embracing the outer ball end 14*a* of the second piston 14 slips relative to the second swash plate 17 so that the second rotating shaft 2 united with the second swash plate 17 rotates in the opposite direction relative to the first rotating shaft 1. When the second piston 14 ends its backward stroke to reach its bottom dead center, the second cylinder 13 has its communication blocked from the second common liquid passage 23 by the spool 26. When the second piston 14 starts its forward stroke, the second cylinder 13 is caused to communicate with the first common liquid passage 22 by the spool 26. As a result, the high-pressure liquid in the second cylinder 13 is supplied via the cylinder port 30 and the spool bore 25 to the first common liquid passage 22 and is sucked via the spool bore 24 and the cylinder port 21 into the first cylinder 6 during the backward stroke so that the power generated by the second rotating shaft 2 is regenerated.

Here, the number of revolutions $n_2$ of the second rotating shaft 2 is expressed by the following equation, if the number of revolutions of the first rotating shaft is denoted at $n_1$, the stroke volume of the first cylinders 6 at $V_1$, and the stroke volume of the second cylinders 13 at $V_2$:

$$n_2 = n_1 \cdot (1 - V_1/V_2).$$

Hence, the number of revolutions $n_2$ of the second rotating shaft 2 can be arbitrarily reduced if the stroke volume $V_1$ is varied by turning the first swash plate 10 around the trunnion 11 to vary the angle of inclination of the inclined face 10A. If, on the contrary, the angle of inclination of the inclined face 10*a*of the first swash plate 10 is inclined in the opposite direction, the second rotating shaft 2 rotates faster than the first rotating shaft 1 to establish an acceleration mode.

If, on the other hand, the angle of inclination of the inclined face 10*a* of the first swash plate 10 is reduced to zero, the first piston 7 stops its reciprocations so that the second piston 14 also stops its reciprocations. As a result, the second cylinder barrel 4, the second swash plate 17 and the second rotating shaft 2 are rotated together at the same speed as that of the first rotating shaft 1 so that the power inputted to the first rotating shaft 1 is mechanically transmitted to the second rotating shaft 2 in an efficient manner.

On the other hand, the power can be extracted from the first rotating shaft 1 by inputting it to the second rotating shaft 2. The number of revolutions $n_1$ of the first rotating shaft 1 in this case is expressed by the following equation:

$$n_1 = n_2 \cdot V_2/(V_1 + V_2) = n_2/[(V_1/V_2) + 1].$$

During running of this transmission, leakage of the working liquid will inevitably occur. In this case of leakage, the supply liquid is supplied from the supply port 43 to the first or second common liquid passage 22 or 23 at a lower-pressure side.

The foregoing embodiment is equipped with the ring 20 for preventing the first spool 18 from coming in, but the ring 20 can be dispensed with. Moreover, the ring 27 is arranged to prevent the second spool 26 from coming out but may be replaced by a spring or the like for the same purpose.

In the transmission of this embodiment, the first swash plate 10 and its inclining mechanism are irrotationally supported by the casing 12 so that the first swash plate 10 can be smoothly and easily inclined even during running. Since, moreover, the first and second cylinder barrels 3 and 4 are united with the valve block 5 so that they do not slide with respect to the valve block 5, in contrast with those of the prior art, neither friction loss nor liquid leakage from the sliding faces will occur. Since, still moreover, the first and second rotating shafts 1 and 2 are aligned with each other, the power input/output mechanism can be small-sized and simplified. Since the casing can be single walled, furthermore, the transmission in its entirety can be small-sized.

A second embodiment of the present invention is shown in FIGS. 4 to 7.

The face of the valve block 5 facing the first cylinder barrel 3 is formed with an annular groove 120, and an annular clearance 121 is defined in the valve block 5 by the groove 120 and the inner end face of the first cylinder barrel 3.

On the other hand, the face of the valve block 5 facing the second cylinder barrel 4 is formed with an annular groove 122, and an annular clearance 123 is defined in the valve block 5 by the groove 122 and the inner end face of the second cylinder barrel 4.

Cocoon-shaped openings 21*a* for the first cylinder port 21 are formed in the radially central portion of the clearance 121, and cocoon-shaped openings 30*a* for the second cylinder port 30 are formed in the radially central portion of the clearance 123. Moreover, the radially outer end portion of the clearance 121 communicates with the radially outer end portion of the clearance 123 by way of a number of first common liquid passages 124 which are formed in the valve block 5 at a predetermined circumferential spacing. The radially inner portion of the clearance 121 communicates with the radially inner portion of the clearance 123 by way of a number of second common liquid passages 125 which are formed in the valve block 5 at a predetermined circumferential spacing.

In the clearance 121, there is fitted liquid-tight and slidably with the offset $\delta$ from the axis of the valve block 5 along the trunnion 11 an annular first change-over valve 126 which has substantially the same diameter as the circle around which the cocoon-shaped openings 21*a* are arranged and which has a slightly larger thickness than the length of the minor axis of the cocoon-shaped openings 21*a*. This first change-over valve 126 partitions the clearance 121 into an outer chamber 121*a* and an inner chamber 121*b*.

Likewise in the clearance 123, there is fitted liquid-tight and slidably with the offset $\delta$ from the axis of the valve block 5 along the neutral line of the inclined face 17*a* of the second swash plate 17 an annular second change-over valve 127 which has substantially the same diameter as the circle around which the cocoon-shaped openings 30*a* are arranged and which has a slightly larger thickness than the length of the minor axis of the cocoon-shaped openings 30*a*. This second change-over valve 127 partitions the clearance 123 into an outer chamber 123*a* and an inner chamber 123*b*.

A plurality of (e.g., seven, as shown) drive rods 128 of equal length have their inner ends held in abutting contact with the periphery of the first change-over valve 126 at a predetermined circumferential spacing. Those drive rods 128 extend liquid-tight and slidably through holes 129, which are so formed in the valve block 5 as to extend in the radial directions, and have their outer ends held in abutting contact with the inner cylindrical cam face 19*b* of the cam ring 19*a*, which is formed of the inner race of the bearing 19.

On the other hand, a plurality of (e.g., five, as shown) drive rods 130 have their outer ends held in sliding contact with the inner surface of the second change-over valve 127 at a predetermined circumferential spacing. Those drive rods 130 extend liquid-tight and slidably through holes 131, which are so formed in the valve block 5 as to extend in the radial directions, and have their inner ends held in sliding contact with the peripheral cam face 28*a* of the cam ring 28.

Moreover, the valve block 5 and the first cylinder barrel 3 are fastened to each other by a plurality of (e.g., seven, as shown) bolts 132 which extend in the axial direction at a predetermined circumferential spacing. Moreover, the valve block 5 and the second cylinder barrel 4 are fastened to each other by means of a plurality of (e.g., seven, as shown) bolts 133 which extend in the axial direction at a predetermined circumferential spacing. The remaining construction is similar to that of the first embodiment shown in FIGS. 1 to 3, and the corresponding members are designated with common reference numerals.

When the first rotating shaft 1 is rotationally driven, it rotates the first cylinder barrel 3, the valve block 5 and the second cylinder barrel 4 so that each first piston 7 is axially reciprocated in the corresponding first cylinder 6.

Simultaneously with this, the plural drive rods 128 have their outer ends sliding on the cylindrical cam face 19*b* of the cam ring 19*a* so that they reciprocate in the radial directions. As a result, the first change-over valve 126 eccentrically rocks in the clearance 121 to open the cocoon-shaped opening 21*a* of the first cylinder port 21, which communicates with the first cylinder 6 fitting the first piston 7 therein in its backward stroke, into the outer chamber 121*a*, and the cocoon-shaped opening 21*a* of the first cylinder port 21, which communicates with the first cylinder 6 fitting the first piston 7 therein during its forward stroke, into the inner chamber 121*b*.

On the other hand, the plural drive rods 130 have their inner ends sliding on the cylindrical cam face 28*a* of the cam ring 28 so that they reciprocate in the radial directions. As a result, the second change-over valve 127 eccentrically rocks in the clearance 123 to open both the cocoon-shaped opening 30*a* of the first cylinder port 30, which communicates with the second cylinder 13 fitting the second piston 14 therein in its forward stroke, into the outer chamber 123*a*, and the cocoon-shaped opening 30*a* of the second cylinder port 30, which communicates with the second cylinder 13 fitting the second piston 14 therein during its backward stroke, into the inner chamber 123*b*.

Thus, the liquid discharged from the first cylinder 6 during its forward stroke is sucked into the second cylinder 13 during its backward stroke by way of the first cylinder port 21, the inner chamber 121*b* of the clearance 121, the second common liquid passages 125, the inner chamber 123*a* of the clearance 123 and the second cylinder port 30. Then, the liquid discharged from the second cylinder 13 during its forward stroke is sucked into the first cylinder 6 during its backward stroke by way of the second cylinder port 30, the outer chamber 123*a* of the clearance 123, the first common liquid passages 124, the outer chamber 121*a* of the clearance 121 and the first cylinder port 21.

Figure 8:
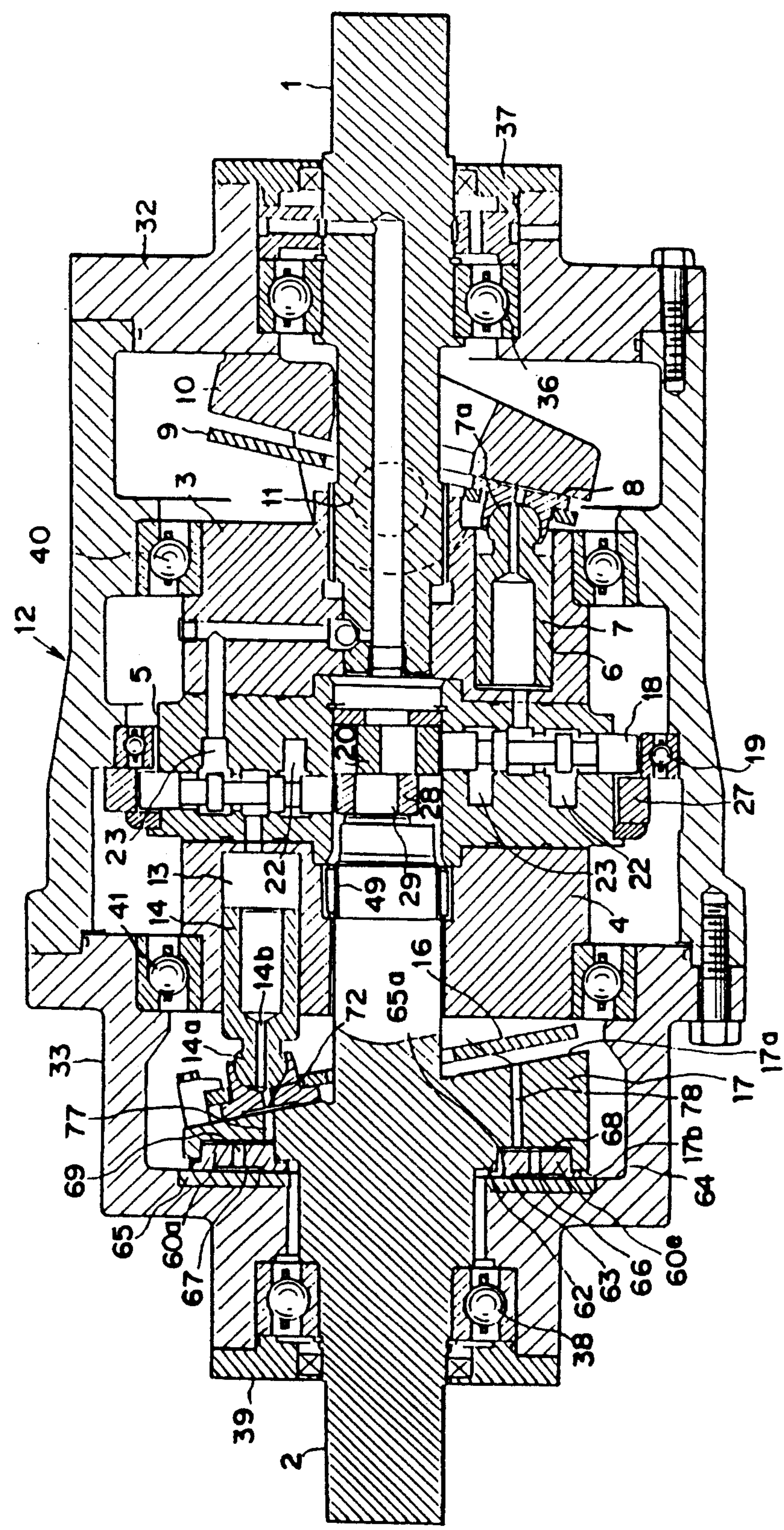
FIG. 8 is a longitudinal section.
Figure 9:
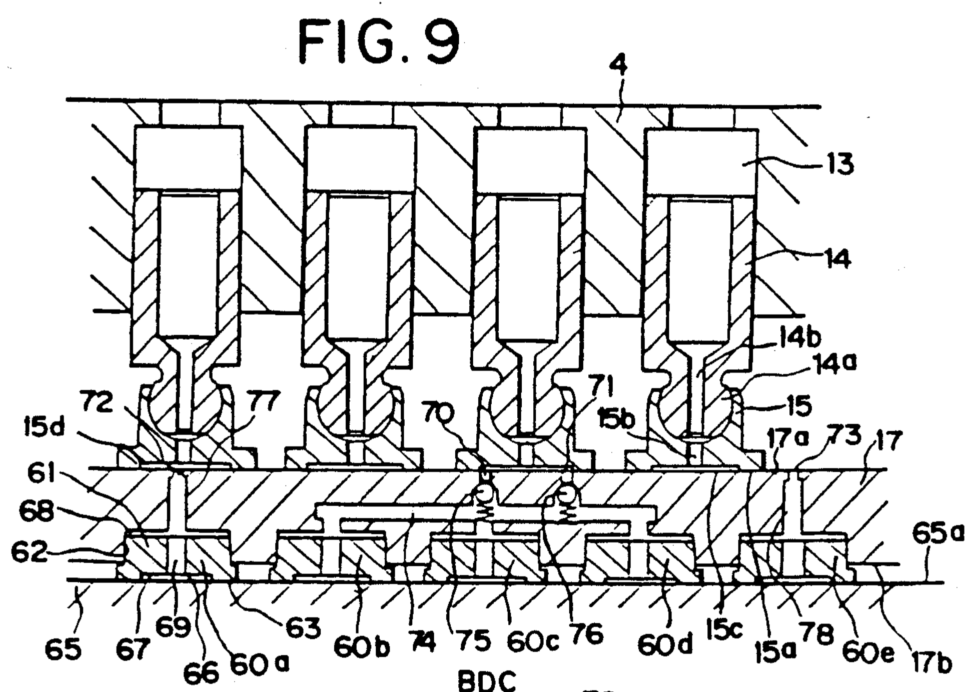
FIG. 9 is a schematic section showing the liquid passages to the balance pads.
Figure 10A:
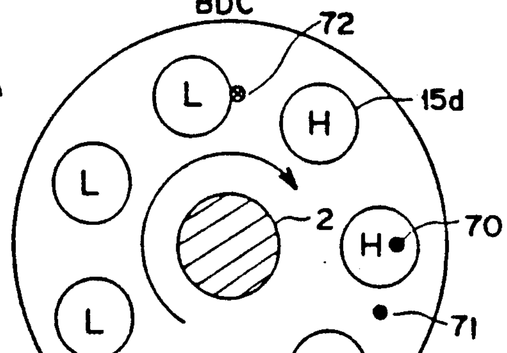
FIGS. 10(A), 10(B) and 10(C) are explanatory views showing the relative positions between the pockets and the liquid passages.
Figure 10B:
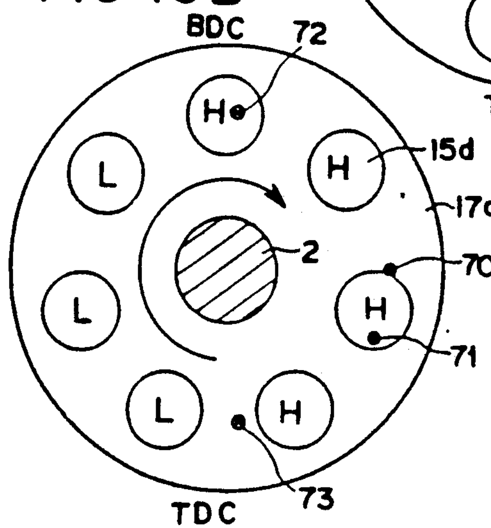
Figure 10C:
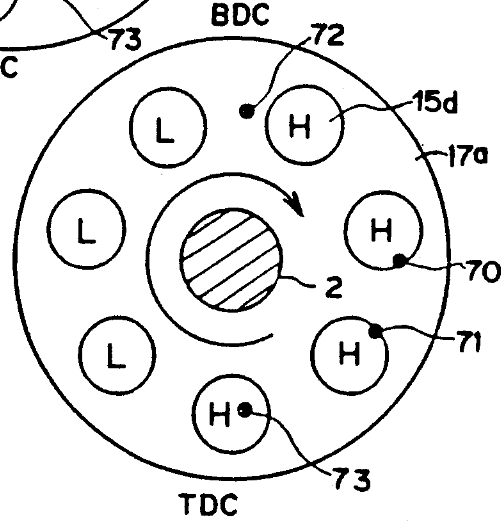
Figure 11:
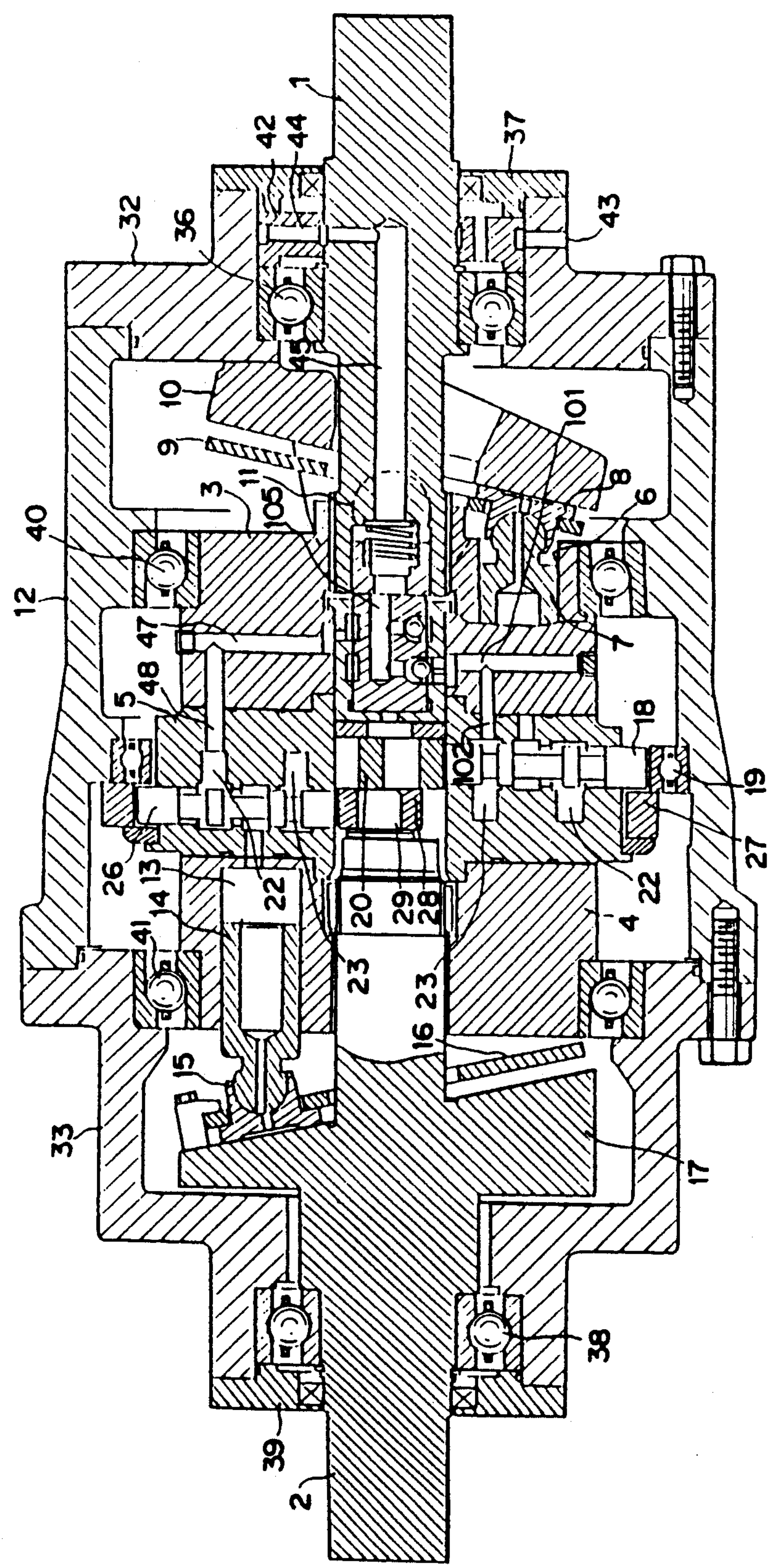
FIG. 11 is a longitudinal section.
Figure 12:
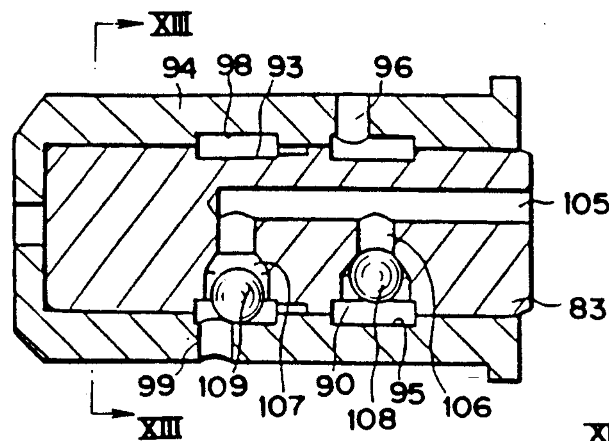
FIG. 12 is an enlarged section showing a portion of FIG. 11.
Figure 13:
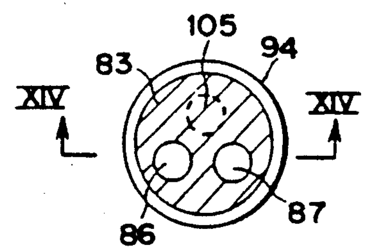
FIG. 13 is a section taken along line XIII—XIII of FIG. 12.
Figure 14:
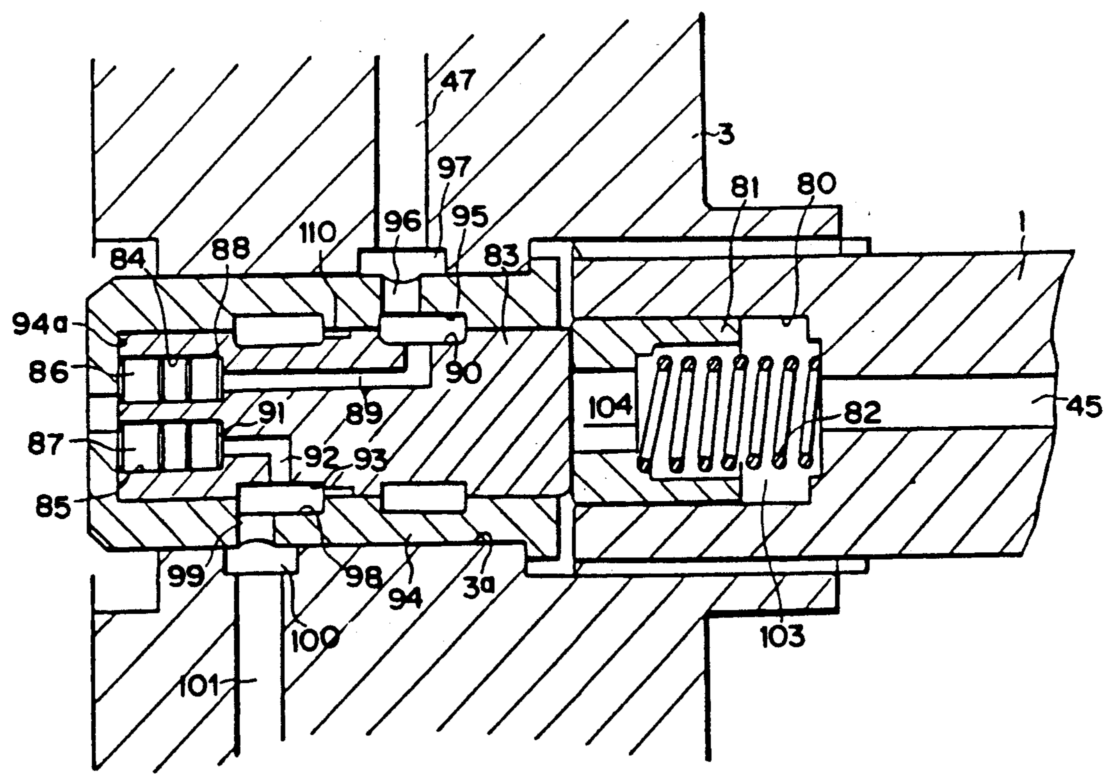
FIG. 14 is a section taken along line XIV—XIV of FIG. 13.
Figure 15:
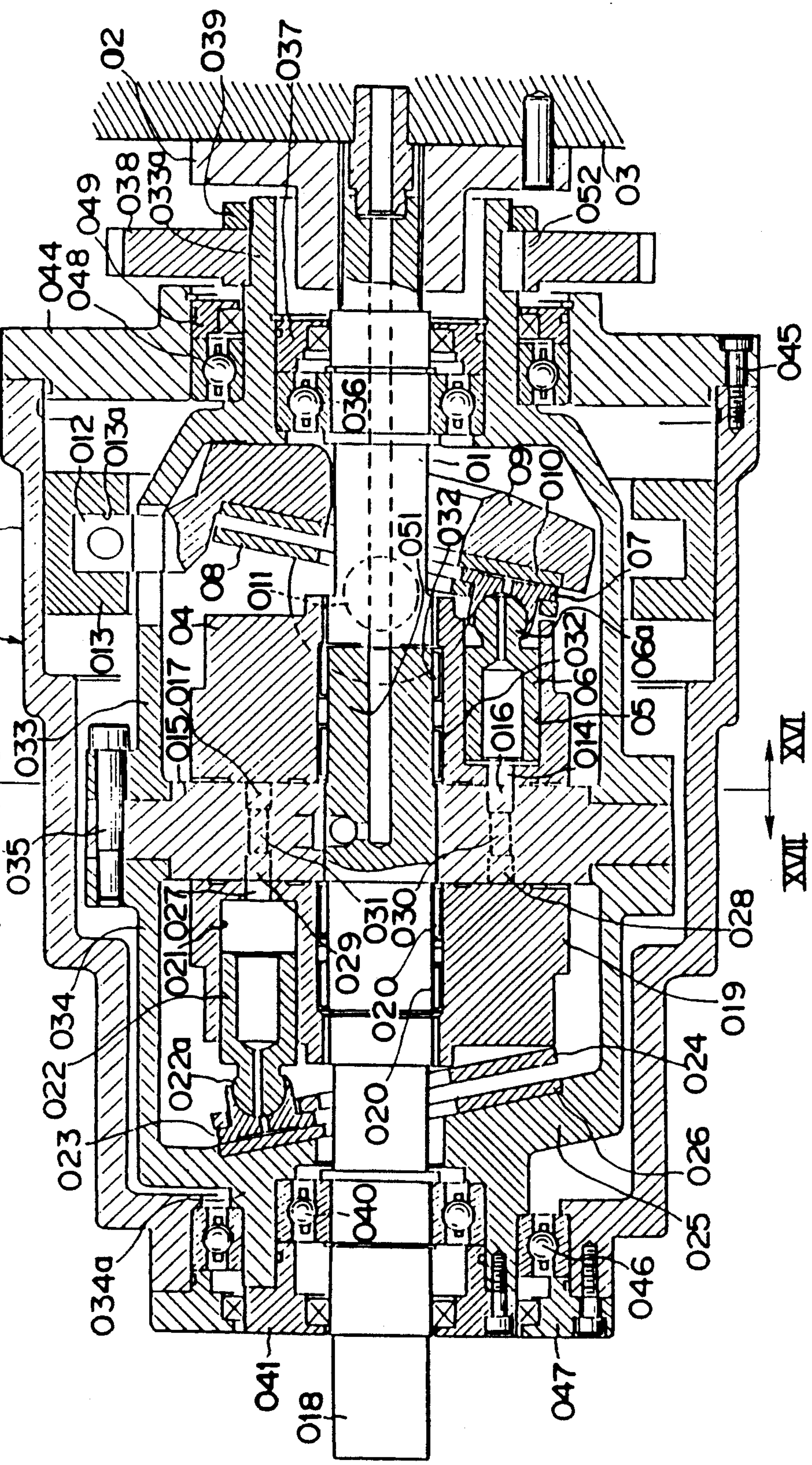
FIG. 15 is a longitudinal section.
Figure 16:
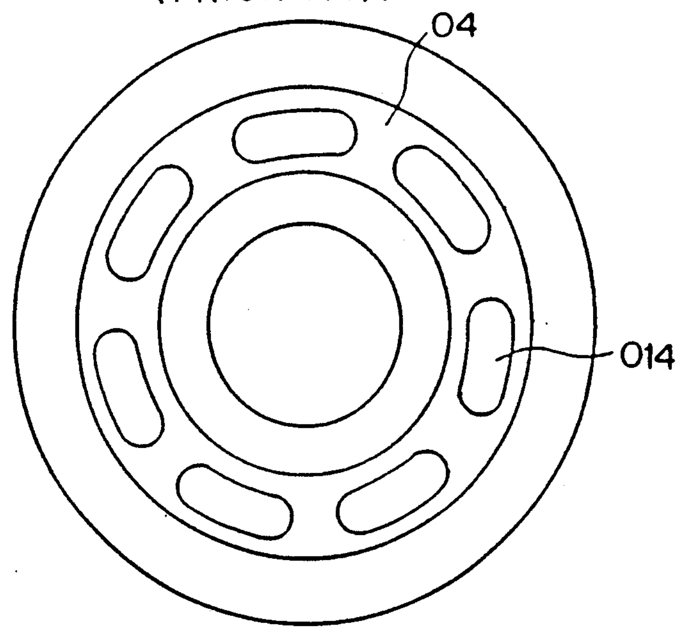
FIG. 16 is an end face taken along line XVI—XVI of FIG. 15.
Figure 17:
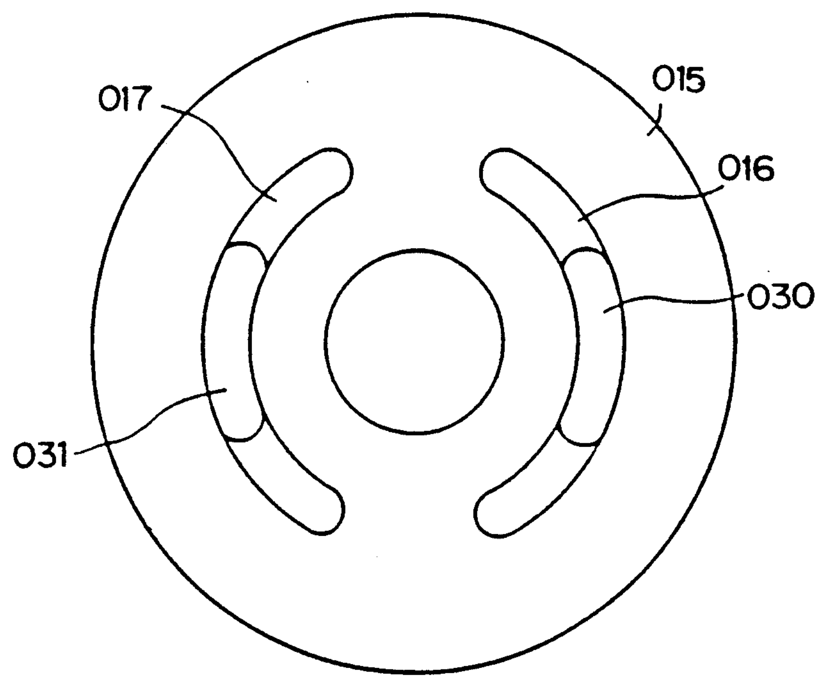
FIG. 17 is an end face taken along line XVII—XVII of FIG. 15.

A third embodiment of the present invention is shown in FIGS. 8 to 10.

At the back of the inclined face 17*a* of the second swash plate 17, there are disposed a plurality of (e.g., five, as shown) balance pads 60*a*, 60*b*, 60*c*, 60*d* and 60*e* which are arranged at a predetermined circumferential spacing around a circle the center of which is the axis of the second swash plate 17. The balance pad 60*a* is arranged at the position of the bottom dead center (BDC); the balance pad 60*e* is arranged at the position of the top dead center (TDC); and the remaining balance pads 60*b*, 60*c* and 60*d* are arranged at one side of the line joining the top and bottom dead centers. Each of these balance pads has its head 61 fitted liquid-tight and slidably in a recess 62 which is so formed in the back face 17*b* of the second swash plate 17 as to extend in the axial direction. The lower sliding face 63 of each balance pad is held in sliding contact with the surface sliding face 65*a* of a wear-resisting liner 65 which is fixed on the inner end face 64 of the end plate 33 of the casing 12 facing the back face 17*b*. A pocket 67 is defined by that sliding face 65*a* and a recess 66 which is formed in the sliding face 63 of each balance pad. A pressure chamber 68 is defined by the top face of each balance pad and the recess 62. These pressure chamber 68 and pocket 67 are caused to communicate with each other through a hole 69 extending through each balance pad. Liquid inlet ports 70, 71, 72 and 73 are opened in the inclined face 17*a* of the second swash plate 17. The high-pressure liquid introduced from the liquid inlet ports 70 and 71 flows through a liquid passage 74, which is formed in the second swash plate 17, to open check valves 75 and 76, which are disposed in that liquid passage 74, so that it is supplied to the pressure chambers 68 of the balance pads 60*b*, 60*c* and 60*d*. The high-pressure liquid introduced from the liquid inlet port 72 is supplied via a liquid passage 77 to the pressure chamber 68 of the balance pad 60*a*. The high-pressure liquid introduced from the inlet port 73 is supplied via a liquid passage 78 to the pressure chamber 68 of the balance pad 60*e*.

Thus, if the pocket 15*d* defined by both the recess 15*c* formed in the sliding face 15*a* of the slipper pad 15 and the inclined face 17*a* passes over the top dead center (TDC) when the slipper pad 15 slides, as indicated by arrow, on the inclined face 17*a* of the second swash plate 17, the second piston 14 comes into its backward stroke to suck the high-pressure liquid into the second cylinder 13. As a result, the liquid in the pocket 15*d* is under the high pressure during the suction stroke, i.e., while the pocket 15*d* is moving at the high-pressure side. During the discharge stroke of the second piston 14, on the contrary, while the pocket 15*d* is passing over the top dead center (TDC), i.e., while the pocket 15*d* is moving at the low-pressure side, the liquid in the pocket 15*d* is under the low pressure. Thus, as shown, the insides of the three pockets 15*d* are under the high pressure (as indicated at H) at all times, in the case of the seven slipper pads 15, and under the low pressure (as indicated at L) at all times in the case of the three slipper pockets 15*d*. On the contrary, the inside of the remaining one pocket 15*d* takes the high or low pressure at each half pitch. Therefore, the inlet ports 70 and/or 71 are opened in positions to communicate with the high-pressure pockets 15*d*, whereas the inlet ports 72 and 73 are opened in positions having no communication with the high-pressure pockets 15*d*. As a result, both the inlet ports 72 and 73 do not communicate with the pockets 15*d* in the case shown in FIG. 10(A); only the inlet port 72 communicates with the pockets 15*d* in the case shown in FIG. 10(B); and only the inlet port 73 communicates with the pockets 15*d* in the case shown in FIG. 10(C).

Thus, when the second piston 14 is pushed by the high-pressure liquid supplied to the second cylinder 13 as a result of relative rotations of the second swash plate 17 and the second cylinder barrel 4, the liquid pressure applied to the second piston 14 is loaded as an axial thrust upon the second swash plate 17 and the second rotating shaft 2 through the slipper pad 15. However, the high-pressure liquid in the second cylinder 13 is supplied to the three or four pockets 67 and the pressure chamber 68 by way of the hole 14*b*, the pocket 15*d*, the liquid inlet ports 70 to 73, the liquid passage 74, the check valves 75 and 76 and the liquid passages 77 and 78 so that a reaction in the opposite direction of the aforementioned axial thrust is generated by the high pressure of the high-pressure liquid. As a result, the axial thrust to be loaded upon the bearing 38 can be lightened to elongate the lifetime of the bearing 38. The check valves 75 and 76 are disposed in the liquid passage 74 so as to prevent the high-pressure liquid from leaking from the pressure chambers 68 of the balance pads 60*b*, 60*c* and 60*d* when either of the inlet port 70 or 71 has no communication with the high-pressure pocket 15*a*. Moreover, those balance pads 60*b*, 60*c* and 60*d* can be replaced by one or two balance pads having a large area.

In the foregoing embodiment, still moreover, the balance pads are arranged only at the high-pressure side. In case, however, the high-pressure side rotates backward, e.g., in case the second rotating shaft 2 rotates in the opposite direction, the balance pads may desirably be arranged at not only the high-pressure side but also the low-pressure side.

A fourth embodiment of the present invention is shown in FIGS. 11 to 14.

A pressure control piston 81 is fitted liquid-tight and slidably in a recess 80 which is so formed in the inner end face of the first rotating shaft 1 as to extend in the axial direction thereof. The pressure control piston 81 is thrust by a coil spring 82, which is arranged at the back thereof, to abut against the back end face of a safety valve spool 83. This safety valve spool 83 is fitted liquid-tight and slidably in a sleeve 94 which is fixedly fitted in the central clearance 3*a* of the cylinder barrel 3. Plungers 86 and 87 are fitted liquid-tight and slidably in a pair of recesses 84 and 85, respectively, which extend from the inner end face of the safety valve spool 83 in the axial direction. The outer end faces of those plungers 86 and 87 are held in abutting contact with the bottom face 94*a* of the sleeve 94. Moreover, a chamber 88 is defined by the inner end face of the plunger 86 and the recess 84 and communicates with an annular groove 90, which is formed in the periphery of the safety valve spool 83, through a hole formed in the safety valve spool 83. A chamber 91 is also defined by the inner end face of the plunger 87 and the recess 85 and communicates with an annular groove 93, which is formed in the periphery of the safety valve spool 83, through a hole 89 formed in the safety valve spool 83. The groove 90 communicates with an annular groove 95 which is formed in the inner surface of the sleeve 94. The annular groove 95 in turn communicates with the passage 47 through both a hole 96 extending through the sleeve 94 and a groove 97 formed in the inner surface of the cylinder barrel 3. The passage 47 in turn communicates with the first common liquid passage 22 by way of the passage 48.

The groove 93 communicates with an annular groove 98 which is formed in the inner surface of the sleeve 94, whereas the groove 98 communicates with a passage 101 by way of both a hole 99 extending through the sleeve 94 and a groove 100 formed in the inner surface of the cylinder barrel 3. That passage 101 in turn communicates with the second common liquid passage 23 by way of a passage 102 which is formed in the valve block 5. The passage 45 extending along the axis of the first rotating shaft 1 communicates with a chamber 103 which is defined by the recess 80 and the pressure control piston 81. The chamber 103 in turn communicates with a bore 105, which is so formed in the safety valve spool 83 as to extend in the axial direction, through a bore 104 formed in the outer end face of the pressure control piston 81. The bore 105 communicates with the groove 90 through a hole 106 and with the groove 93 through a hole 107. Moreover, a ball 108 is arranged in the hole 106 to constitute a check valve for allowing the flow of the liquid toward the groove 90 but blocking it in the opposite direction. There is also arranged in the hole 107 a ball 109 for allowing the flow of the liquid toward the groove 93 but blocking it in the opposite direction.

During running of the transmission of the fourth embodiment, the liquid in either the first or second common liquid passage 22 or 23 takes the high pressure whereas the liquid of the other takes the low pressure, and an inevitable leakage takes place in the course of circulation of the liquid. Now, if it is assumed that the liquid in the first common liquid passage 22 takes the high pressure whereas the liquid in the second common liquid passage 23 takes the low pressure, the supply liquid from the supply port 43 lifts the ball 109 through the passages 44 and 45, the chamber 103 and the holes 104, 105 and 107 until it is supplied to the second common passage 23 through the recesses 93 and 98, the hole 99, the recess 100 and the passages 101 and 102. At this time, the high pressure in the first common liquid passage 22 acts upon the ball 108 so that the ball 108 is seated. If, in this state, the pressure of the liquid in the first common liquid passage 22 is raised to exceed a predetermined level by the increase in the load supported by the transmission, it is applied to the chamber 88 through the passages 48 and 47, the groove 97, the hole 96, the grooves 95 and 90 and the hole 89 to push the plunger 86. Then, this reaction moves the safety valve spool 83 and the pressure control piston 81 outward against the coil spring 82 and the pushing force of the supply liquid supplied to the chamber 103. In accordance with this outward movement, the groove 95 communicates with the groove 98 through the groove 110 and with the second common liquid passage 23 under the low pressure through the hole 99, the groove 100 and the passages 101 and 102. Thus, the liquid in the first common liquid passage 22 under the high pressure is released to the first common liquid passage 22 under the low pressure to prevent breakage of the transmission.

The description thus far made is directed to the case in which the liquid in the first common liquid passage 22 takes the high pressure whereas the liquid in the second common liquid passage 23 takes the low pressure. In the reverse case, i.e., in case the liquid in the first common liquid passage 22 takes the low pressure whereas the liquid in the second common liquid passage 23 takes the high pressure, the supply liquid can be supplied as in the aforementioned case to block the overpressure in the second common liquid passage 23.

On the other hand, the pressure of the supply liquid can be controlled remotely from outside of the transmission during running of the transmission so that the allowable pressure of the liquid in the first or second common liquid passage 22 or 23 can be set at an arbitrary level by setting the pressure of the supply liquid at an arbitrary level. Moreover, the supply liquid can be supplied while preventing the overpressure of the liquid irrespective of the rotating direction of the transmission and which of the rotating shafts is given the power, by incorporating the two plungers 86 and 87 and the two check valves 108 and 109 into the safety valve spool 83. Since, moreover, the balls 108 and 109 constituting the check valves are incorporated into the safety valve spool 83 moving in the axial directions, the recesses communicating with the first and second common liquid passages 22 and 23 can be commonly used, and the structure can be simplified and small-sized so that the transmission of the invention can be arranged without any difficulty in the limited space of the inside of a rotating member. The pressure control piston 81 and the safety valve spool 83 are made separate in the foregoing embodiments but can be integrated. Moreover, the coil spring 82 can be dispensed with.

While only certain embodiments of the invention have been specifically described herein, it will be apparent that numerous modifications may be made therein within the scope of the appended claims and without departing from the spirit and scope of the invention.

What is claimed is:

1. A hydraulic transmission comprising: a first cylinder barrel rotatable around a common axis; a second cylinder barrel arranged coaxially with said first cylinder barrel; a valve block interposed between and united with said first cylinder barrel and said second cylinder barrel; a plurality of first cylinders formed in said first cylinder barrel to extend from an outer end face thereof substantially in the direction of said common axis and arranged at a predetermined spacing from one another in a circumferential direction around said common axis; a first swash plate having an inclined face and an axis of rotation perpendicular to said common axis; a plurality of first pistons fitted liquid-tight and slidably in said first cylinders, respectively, and adapted to be reciprocated by having outer ends thereof held in abutting contact with said first swash plate as said first cylinder barrel rotates; a plurality of second cylinders formed in said second cylinder barrel to extend from an outer end face thereof substantially in the direction of said common axis and arranged at a predetermined spacing from one another in a circumferential direction around said common axis; a second swash plate united with a rotating shaft rotatable around said common axis and having an inclined face; a plurality of second pistons fitted liquid-tight and slidably in said second cylinders, respectively, and adapted to be reciprocated by having outer ends thereof held in abutting contact with said second swash plate as said second cylinder barrel rotates; a first change-over valve build into said valve block and switched according to rotations of said valve block for causing said first cylinders to communicate with a first common liquid passage during forward strokes of said first pistons and to communicate with a second common liquid passage during backward strokes of said first pistons; a second change-over valve build into said valve block and switched according to relative rotations of said valve block and said rotating shaft for causing said second cylinders to communicate with said first common liquid passage during backward strokes of said second pistons and to communicate with said second common liquid passage during forward strokes of said second pistons; balance pads fitted liquid-tight and slidably in second recesses formed axially in an outer end face of said second swash plate; a stationary casing facing but spaced from the outer end face of said second swash plate and held in sliding contact with outer faces of said balance pads; liquid passages for supplying high-pressure liquid from said second cylinders to pressure chambers which are defined by inner faces of said balance pads and said second recesses and check valves in said liquid passages for blocking the flow of liquid from said pressure chambers.

2. A hydraulic transmission according to claim 1, wherein a plurality of said second recesses are arranged at a predetermined spacing in a circumferential direction around a circle of which the center is the common axis of said second swash plate.

3. A hydraulic transmission according to claim 2, wherein said second recesses are arranged within a range of said second swash plate with which said second pistons fitted in said second cylinders and containing high-pressure liquid are held in sliding contact.

4. A hydraulic transmission according to claim 3, wherein certain of said second recesses are arranged within a range of said second swash plate with which said second pistons fitted in said second cylinders and containing high-pressure liquid are held in sliding contact and further wherein said certain second recesses are always supplied with high-pressure liquid, whereas other second recesses arranged at top dead center and bottom dead center are not simultaneously supplied with high-pressure liquid.

5. A hydraulic transmission according to claim 1, further comprising; pockets defined by both third recesses formed in the outer faces of said balance pads and an inner end face of said stationary casing; and liquid passages for supplying high-pressure liquid in said pressure chambers to said pockets through said balance pads.

6. A hydraulic transmission comprising: a first rotating shaft; a second rotating shaft arranged coaxially with said first rotating shaft; a first cylinder barrel splined to said first rotating shaft; a second cylinder barrel arranged coaxially with and rotatably relative to said second rotating shaft; a valve block interposed between and united with an inner end face of said first cylinder barrel and an inner end face of said second cylinder barrel; a plurality of first cylinders formed in said first cylinder barrel to extend from an outer end face thereof substantially in the direction of the axis of the first cylinder barrel and arranged at a predetermined spacing from one another in a circumferential direction around the axis of the first cylinder barrel; a first swash plate having an inclined face and an axis of rotation perpendicular to said first rotating shaft; a plurality of first pistons fitted liquid-tight and slidably in said first cylinders, respectively, and adapted to be reciprocated by having outer ends thereof held in abutting contact with said first swash plate as said first cylinder barrel rotates; a plurality of second cylinders formed in said second cylinder barrel to extend from an outer end face thereof substantially in the direction of the axis of the second cylinder barrel and arranged at a predetermined spacing from one another in a circumferential direction around the axis of the second cylinder barrel; a second swash plate united with said second rotating shaft and having an inclined face; a plurality of second pistons fitted liquid-tight and slidably in said second cylinders, respectively, and adapted to be reciprocated by having outer ends thereof held in abutting contact with said second swash plate as said second cylinder barrel rotates; a first change-over valve built into said valve block and switched according to rotations of said first rotating shaft for causing said first cylinders to communicate with a first common liquid passage during forward strokes of said first pistons and to communicate with a second common liquid passage during backward strokes of said first pistons; and a second change-over valve built into said valve block and switched according to relative rotations of said first rotating shaft an said second rotating shaft for causing said second cylinders to communicate with said first common liquid passage during backward strokes of said second pistons and to communicate with said second common liquid passage during forward strokes of said second pistons;

wherein said first change-over valve includes: a first annular clearance defined in said valve block and opened by first cylinder ports communicating with said first cylinders; a first annular ring fitted liquid-tight and slidably in said first annular clearance for partitioning said first annular clearance into outer and inner chambers and adapted to be rocked eccentrically in said first annular clearance for causing said first cylinder ports to communicate selectively with one of said outer and inner chambers; a plurality of first drive rods having inner ends held in abutting contact with the outer circumference of said first annular ring at a predetermined spacing in the circumferential direction and fitted liquid-tight and slidably in holes formed in said valve block for reciprocating in radial directions; and a first cam ring arranged with a predetermined offset from the axis of said valve block in the direction of said axis of rotation and having a cylindrical cam face held in abutting contact with outer ends of said first drive rods; wherein said second change-over valve includes: a second annular clearance defined in said valve block and opened by second cylinder ports communicating with said second cylinders; a second annular ring fitted liquid-tight and slidably in said second annular clearance for partitioning said second annular clearance into outer and inner chambers and adapted to be rocked eccentrically in said second annular clearance for causing said second cylinder ports to communicate selectively with one of said outer and inner chambers; a plurality of second drive rods having outer ends held in abutting contact with the inner circumference of said second annular ring at a predetermined spacing in the circumferential direction and fitted liquid-tight and slidably in holes formed in said valve block for reciprocating in radial directions; an eccentric pin projecting from an inner end of said second rotating shaft with a predetermined eccentricity from the axis of said second rotating shaft in the direction of a neutral line of the inclined face of said second swash plate; and a second cam ring arranged in a bore which is formed at the center of said valve block, fitted on said eccentric pin, and having a cylindrical cam face held in abutting contact with inner ends of said second drive rods; and wherein said first common liquid passage provides communication between the outer chamber of said first annular clearance and the outer chamber of said second annular clearance, whereas said second common liquid passage provides communication between the inner chamber of said first annular clearance and the inner chamber of said annular clearance.

7. A hydraulic transmission comprising: a first cylinder barrel rotatable around a common axis; a second cylinder barrel arranged coaxially with said first cylinder barrel; a valve block interposed between and united with said first cylinder barrel and said second cylinder barrel; a plurality of first cylinders formed in said first cylinder barrel to extend from an outer end face thereof substantially in the direction of said common axis and arranged at a predetermined spacing from one another in a circumferential direction around said common axis; a first swash plate having an inclined face and an axis of rotation perpendicular to said common axis; a plurality of first pistons fitted liquid-tight and slidably in said first cylinders, respectively, and adapted to be reciprocated by having outer ends thereof held in abutting contact with said first swash plate as said first cylinder barrel rotates; a plurality of second cylinders formed in said second cylinder barrel to extend from an outer end face thereof substantially in the direction of said common axis and arranged at a predetermined spacing from one another in a circumferential direction around said common axis; a second swash plate united with a rotating shaft rotatable around said common axis and having an included face; a plurality of second pistons fitted liquid-tight and slidably in said second cylinders, respectively, and adapted to be reciprocated by having outer ends thereof held in abutting contact with said second swash plate as said cylinder barrel rotates; a first change-over valve built into said valve block and switched according to rotations of said valve block for causing said first cylinders to communicate with a first common liquid passage during forward strokes of said first pistons and to communicate with a second common liquid passage during backward strokes of said first pistons; and a second change-over valve built into said valve block and switched according to relative rotations of said valve block and said rotating shaft for causing said second cylinders to communicate with said first common liquid passage during backward strokes of said second pistons and to communicate with said second common liquid passage during forward strokes of said second pistons; wherein said first change-over valve includes: a first annular clearance defined in said valve block and opened by first cylinder ports communicating with said first cylinders; a first annular ring fitted liquid-tight and slidably in said first annular clearance for partitioning said first annular clearance into outer and inner chambers and adapted to be rocked eccentrically in said first annular clearance for causing said first cylinder ports to communicate selectively with one of said outer and inner chambers; a plurality of first drive rods having inner ends held in abutting contact with the outer circumference of said first annular ring at a predetermined spacing int he circumferential direction and fitted liquid-tight and slidably in holes formed in said valve block for reciprocating in radial directions; and a first am ring arranged with a predetermined offset from the axis of said valve block in the direction of said axis of rotation and having a cylindrical cam face held in abutting contact with outer ends of said first drive rods; wherein said second change-over valve includes: a second annular clearance defined in said valve block and opened by second cylinder ports communicating with said second cylinders; a second annular ring fitted liquid-tight and slidably in said second annular clearance for partitioning said second annular clearance into outer and inner chambers and adapted to be rocked eccentrically in said second annular clearance for causing said second cylinder ports to communicate selectively with one of said outer and inner chambers; a plurality of second drive rods having outer ends held in abutting contact with the inner circumference of said second annular ring at a predetermined spacing in the circumferential direction and fitted liquid-tight and slidably in holes formed in said valve block for reciprocating in radial directions; an eccentric pin projecting from an inner end of said rotating shaft with a predetermined eccentricity from the axis of said rotating shaft in the direction of a neutral line of the inclined face of said second swash plate; and a second cam ring arranged in a bore which is formed at the center of said valve block, fitted on said eccentric pin, and having a cylindrical cam face held in abutting contact with inner ends of said second drive rods; and wherein said first common liquid passage provides communication between the outer chamber of said first annular clearance and the outer chamber of said second annular clearance, whereas said second common liquid passage provides communication between the inner chamber of said first annular clearance and the inner chamber of said second annular clearance.

8. A hydraulic transmission comprising: a first rotating shaft; a second rotating shaft arranged coaxially with said first rotating shaft; a first cylinder barrel splined to said first rotating shaft; a second cylinder barrel arranged coaxially with and rotatably relative to said second rotting shaft; a valve block interposed between and united with an inner end face of said first cylinder barrel and an inner end face of said second cylinder barrel; a plurality of first cylinders formed in said first cylinder barrel to extend from an outer end face thereof substantially in the direction of the axis of the first cylinder barrel and arranged at a predetermined spacing from one another in a circumferential direction around the axis of the first cylinder barrel; a first swash plate having an inclined face and an axis of rotation perpendicular to said first rotating shaft; a plurality of first pistons fitted liquid-tight and slidably in said first cylinders, respectively, and adapted to be reciprocated by having outer ends thereof held in abutting contact with said first swash plate as said first cylinder barrel rotates; a plurality of second cylinders formed in said second cylinder barrel to extend from an outer end face thereof substantially the direction of the axis of the second cylinder barrel and arranged at a predetermined spacing from one another in a circumferential direction around the axis of the second cylinder barrel; a second swash plate united with said second rotating shaft and having an inclined face; a plurality of second pistons fitted liquid-tight and slidably in said second cylinders, respectively, and adapted to be reciprocated by having outer ends thereof held in abutting contact with said second swash plate as said second cylinder barrel rotates; a first change-over valve built into said valve block and switch according to rotations of said first rotating shaft for causing said first cylinders to communicate with a first common liquid passage during forward strokes of said first pistons and to communicate with a second common liquid passage during backward strokes of said first pistons; a second change-over valve built into said valve block and switched according to relative rotations of said first rotating shaft and said second rotating shaft for causing said second cylinders to communicate with said first common liquid passage during backward strokes of said second pistons and to communicate with said second common liquid passage during forward strokes of said second pistons; and a safety valve spool arranged liquid-tight and slidably coaxially with said first rotating shaft and adapted to move in the axial direction, when a pushing force of liquid in one of said first and second common liquid passages acting upon one end face of said safety valve spool exceeds a pushing force by a supply liquid acting upon another end face of said safety valve spool, for providing communication between said first common liquid passage and said second common liquid passage.

9. A hydraulic transmission according to claim 8, wherein said safety valve spool is arranged in a clearance formed at the center of said first cylinder barrel and has an outer end face acted upon by the pressure of said supply liquid and an inner end face acted upon by the pressure in said first and second common liquid passages.

10. A hydraulic transmission according to claim 8, wherein said safety valve spool is formed with supply liquid passages communicating with said first and second common liquid passages, and wherein check valves are built into said supply liquid passages.

11. A hydraulic transmission comprising: a first cylinder barrel rotatable around a common axis; a second cylinder barrel arranged coaxially with said first cylinder barrel; a valve block interposed between and united with said first cylinder barrel and said second cylinder barrel; a plurality of first cylinders formed in said first cylinder barrel to extend from an outer end face thereof substantially in the direction of said common axis and arranged at a predetermined spacing from one another in a circumferential direction around said common axis; a first swash plate having an inclined face and an axis of rotation perpendicular to said common axis; a plurality of first pistons fitted liquid-tight and slidably in said first cylinders, respectively, and adapted to be reciprocated by having outer ends thereof held in abutting contact with said first swash plate as said first cylinder barrel rotates; a plurality of second cylinders formed in said second cylinder barrel to extend from an outer end face thereof substantially in the direction of said common axis and arranged at a predetermined spacing from ne another in a circumferential direction around said common axis; a second swash plate united with a rotating shaft rotatable around said common axis and having an inclined face; a plurality of second pistons fitted liquid-tight and slidably in said second cylinders, respectively, and adapted to be reciprocated by having outer ends thereof held in abutting contact with said second swash plate as said second cylinder barrel rotates; a first change-over valve built into said valve block and switched according to rotations of said valve block for causing said first cylinders to communicate with a first common liquid passage during forward strokes of said first pistons and to communicate with a second common liquid passage during backward strokes of said first pistons; a second change-over valve built into said valve block and switched according to relative rotations of said valve block and said rotating shaft for causing said second cylinders to communicate with said first common liquid passage during backward strokes of said second pistons and to communicate with said second common liquid passage during forward strokes of said second pistons; and a safety valve pool arranged liquid-tight and slidably coaxially with said common axis and adapted to move in the axial direction, when a pushing force of liquid in one of said first and second common liquid passages acting upon one end face of said safety valve spool exceeds a pushing force by supplying liquid acting upon another end face of said safety valve spool, for providing communication between said first common liquid passage and said second common liquid passage.

12. A hydraulic transmission according to claim 11, wherein said safety valve spool is arranged in clearance formed at the center of said first cylinder barrel and has an outer end face acted upon by the pressure of said supply liquid and an inner end face acted upon by the pressure in said first and second common liquid passages.

13. A hydraulic transmission according to claim 11, wherein said safety valve spool is formed with supply liquid passages communicating with said first and second common liquid passages, and wherein check valves are built into said supply liquid passages.

* * * * *